(12) United States Patent
Lo et al.

(10) Patent No.: US 11,086,179 B2
(45) Date of Patent: Aug. 10, 2021

(54) DISPLAY DEVICE

(71) Applicant: Au Optronics Corporation, Hsinchu (TW)

(72) Inventors: Yen-Hua Lo, Taichung (TW); Sih-Yan Lin, Taipei (TW); Hsin-Chun Huang, Hsinchu County (TW); Hsing-Yi Hsieh, Chiayi (TW)

(73) Assignee: Au Optronics Corporation, Hsinchu (TW)

( * ) Notice: Subject to any disclaimer, the term of this patent is extended or adjusted under 35 U.S.C. 154(b) by 149 days.

(21) Appl. No.: 16/533,749

(22) Filed: Aug. 6, 2019

(65) Prior Publication Data

US 2020/0096829 A1    Mar. 26, 2020

(30) Foreign Application Priority Data

Sep. 21, 2018   (TW) ................................ 107133375

(51) Int. Cl.
*G02F 1/1362*    (2006.01)
*G02F 1/1343*    (2006.01)
*G02F 1/1345*    (2006.01)

(52) U.S. Cl.
CPC ...... *G02F 1/136286* (2013.01); *G02F 1/1345* (2013.01); *G02F 1/134309* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 7,755,591 B2 | 7/2010 | Yeh | |
| 7,916,108 B2 | 3/2011 | Yang et al. | |
| 8,263,979 B2 | 9/2012 | Kuo et al. | |
| 2008/0198290 A1* | 8/2008 | Su | G02F 1/13624 349/48 |
| 2009/0262056 A1 | 10/2009 | Yang et al. | |

FOREIGN PATENT DOCUMENTS

CN             101403838       4/2009

* cited by examiner

*Primary Examiner* — Thanh Nhan P Nguyen
(74) *Attorney, Agent, or Firm* — JCIPRNET

(57) ABSTRACT

A display device includes a first scan line, a second scan line, a first data line, a first pixel unit, a second pixel unit, and a first connection line. The first pixel unit includes a first main-active device, a first sub-active device, a first main-pixel electrode, and a first sub-pixel electrode. The first main-active device is electrically connected with the first scan line and the first data line. The first sub-active device is electrically connected with the first scan line. The second pixel unit includes a second main-active device, a second sub-active device, a second main-pixel electrode, and a second sub-pixel electrode. The second main-active device and the second-sub active device are electrically connected with the second scan line. The first connection line is electrically connected with the first main-active device and the second sub-active device.

14 Claims, 18 Drawing Sheets

DISPLAY DEVICE

CROSS-REFERENCE TO RELATED APPLICATION

This application claims the priority benefit of Taiwan application serial no. 107133375, filed on Sep. 21, 2018. The entirety of the above-mentioned patent application is hereby incorporated by reference herein and made a part of this specification.

BACKGROUND

Field of the Disclosure

The disclosure is related to a display device and more particularly to a display device including the first pixel unit and the second pixel unit.

Description of Related Art

Along with the advancement of technology, the technologies, like Augmented Reality (AR), Virtual Reality (VR), etc., are gradually maturing. In the foreseeable future, the technologies such as AR and VR will be widely used in human life, for example in the fields of education, logistics, medical and military.

Currently, AR and VR are mainly implemented in the head-mounted display. In order to enhance the immersive feeling of the user in AR and VR, the image displayed by the display device must be true enough, and every detail in the image should be clearly displayed. Therefore, the resolution of the display device is especially important. However, in the current display device, it is usually necessary to design through-holes in the display area to connect the elements at different layers, and these through holes limit the size of the pixels, so that it is difficult to improve the resolution of the display device. Therefore, there is an urgent need for a method that can solve the aforementioned problems.

SUMMARY

The disclosure provides a display device capable of solving the problem of insufficient display resolution.

A display device of at least one embodiment of the disclosure includes a first scan line, a second scan line, a first data line, a first pixel unit, a second pixel unit, and a first connection line. The first pixel unit includes a first main-active device, a first sub-active device, a first main-pixel electrode, and a first sub-pixel electrode. The first main-active device is electrically connected with the first scan line and the first data line. The first sub-active device is electrically connected with the first scan line. The first main-pixel electrode is electrically connected with the first main-active device. The first sub-pixel electrode is electrically connected with the first sub-active device. The shape of the first main-pixel electrode is different from the shape of the first sub-pixel electrode. The second pixel unit includes a second main-active device, a second sub-active device, a second main-pixel electrode, and a second sub-pixel electrode. The second main-active device is electrically connected with the second scan line. The second sub-active device is electrically connected with the second scan line. The second main-pixel electrode is electrically connected with the second main-active device. The second sub-pixel electrode is electrically connected with the second sub-active device. The shape of the second main-pixel electrode is different from the shape of the second sub-pixel electrode. The first connection line is electrically connected with the first main-active device and the second sub-active device.

At least one purpose of the disclosure is solving the problem of insufficient display resolution.

At least one purpose of the disclosure is reducing the number of data lines via disposing the first connection line.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
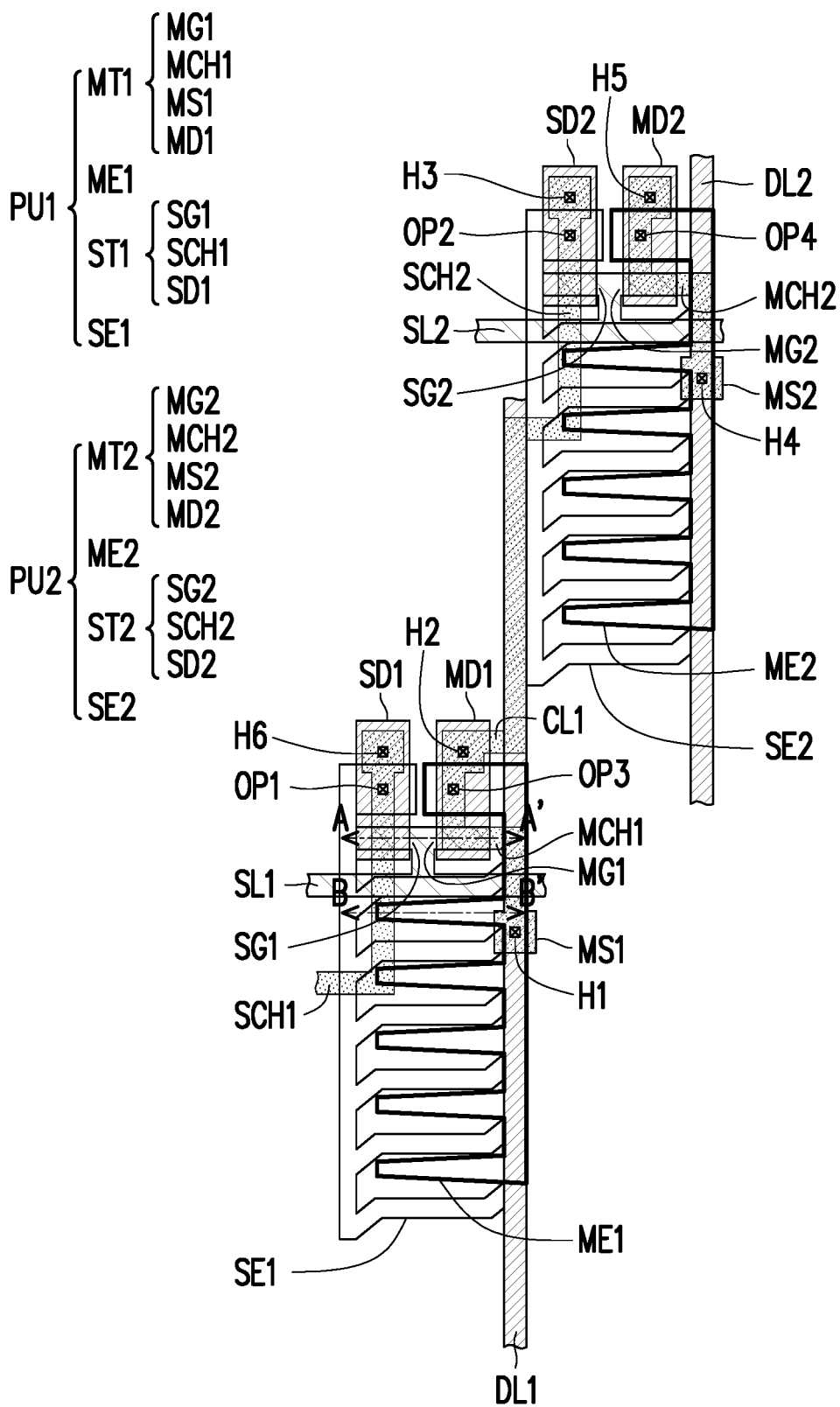
FIG. 1 is a schematic top view of a display device according to the first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2A:
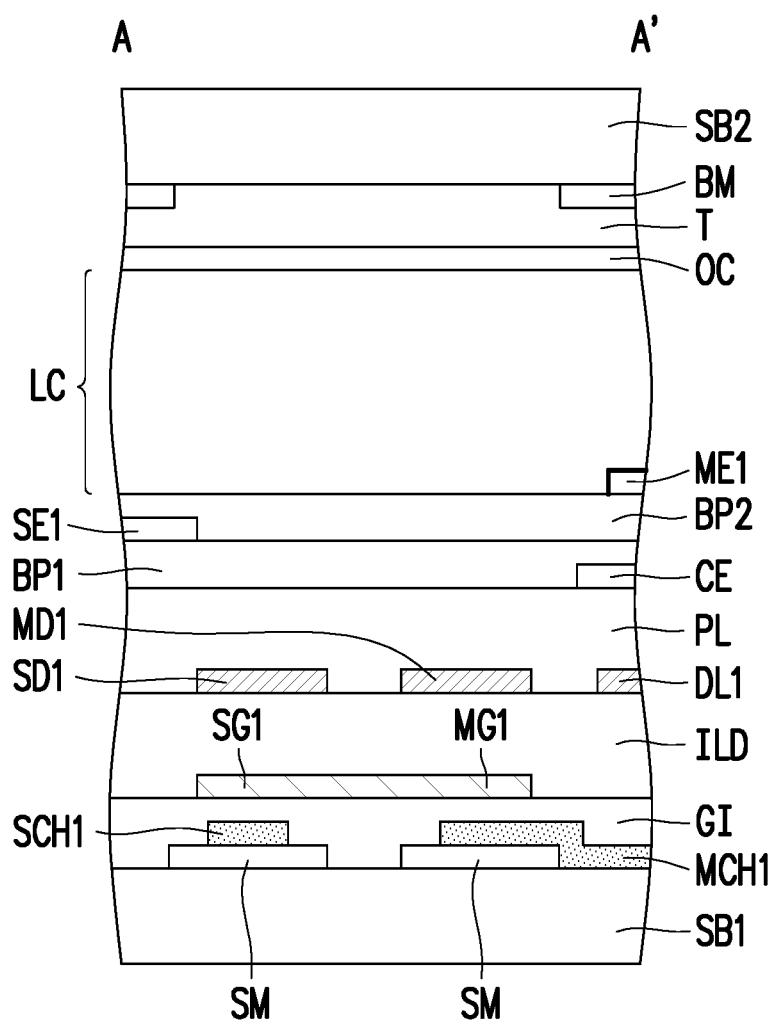
FIG. 2A is a cross-sectional schematic view along a line A-A' depicted in FIG. 1.
Figure 2B:
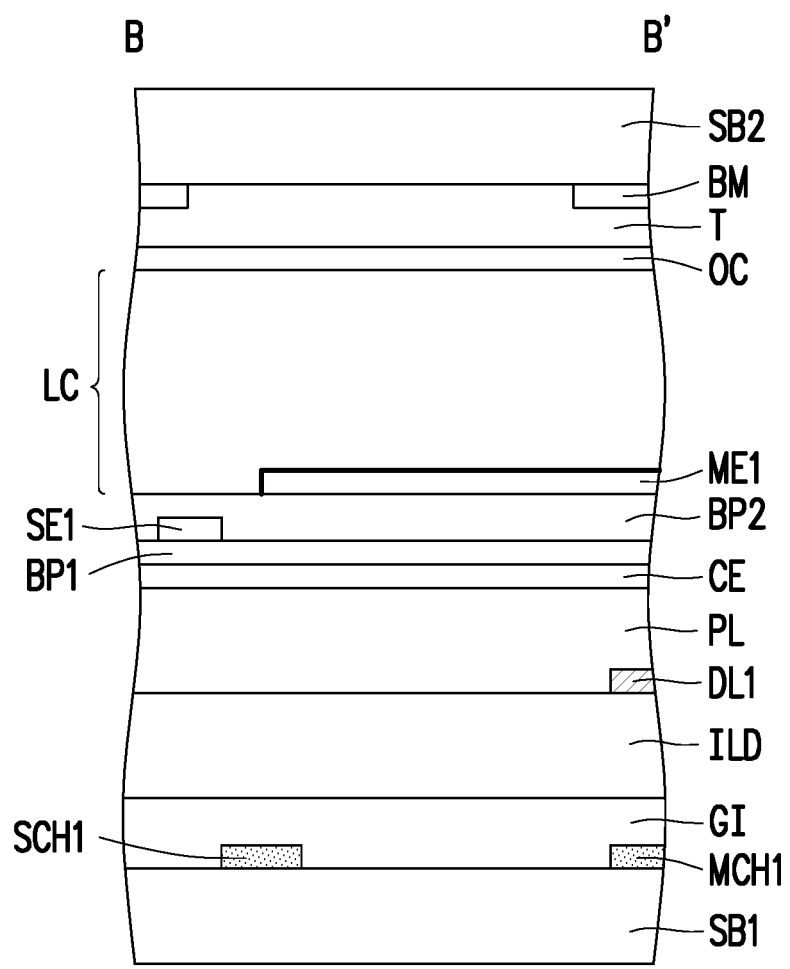
FIG. 2B is a cross-sectional schematic view along a section line B-B' depicted in FIG. 1.
Figure 3A:
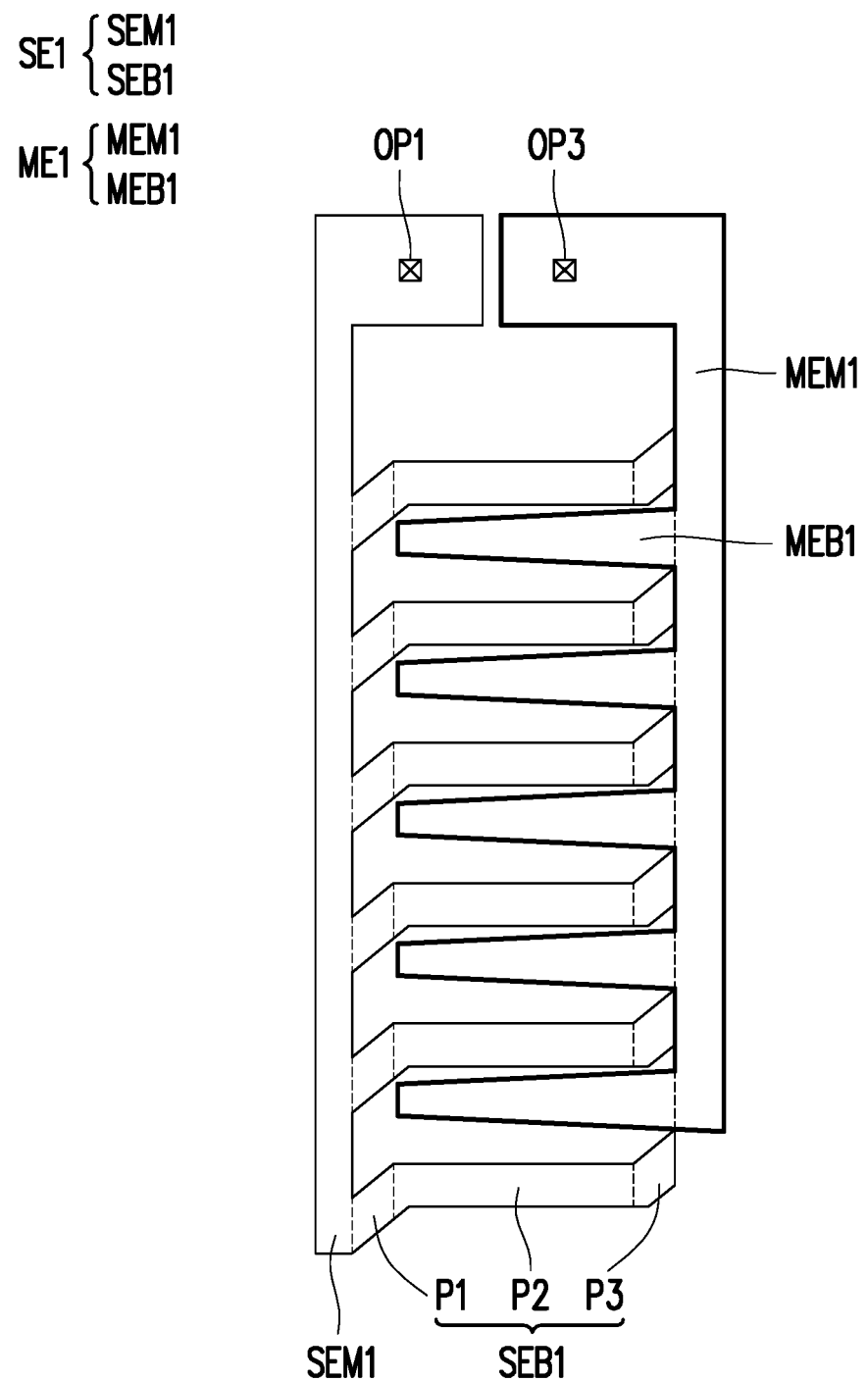
FIG. 3A is a schematic top view of pixel electrodes and openings located on the pixel electrodes of the display device in FIG. 1.
Figure 3B:
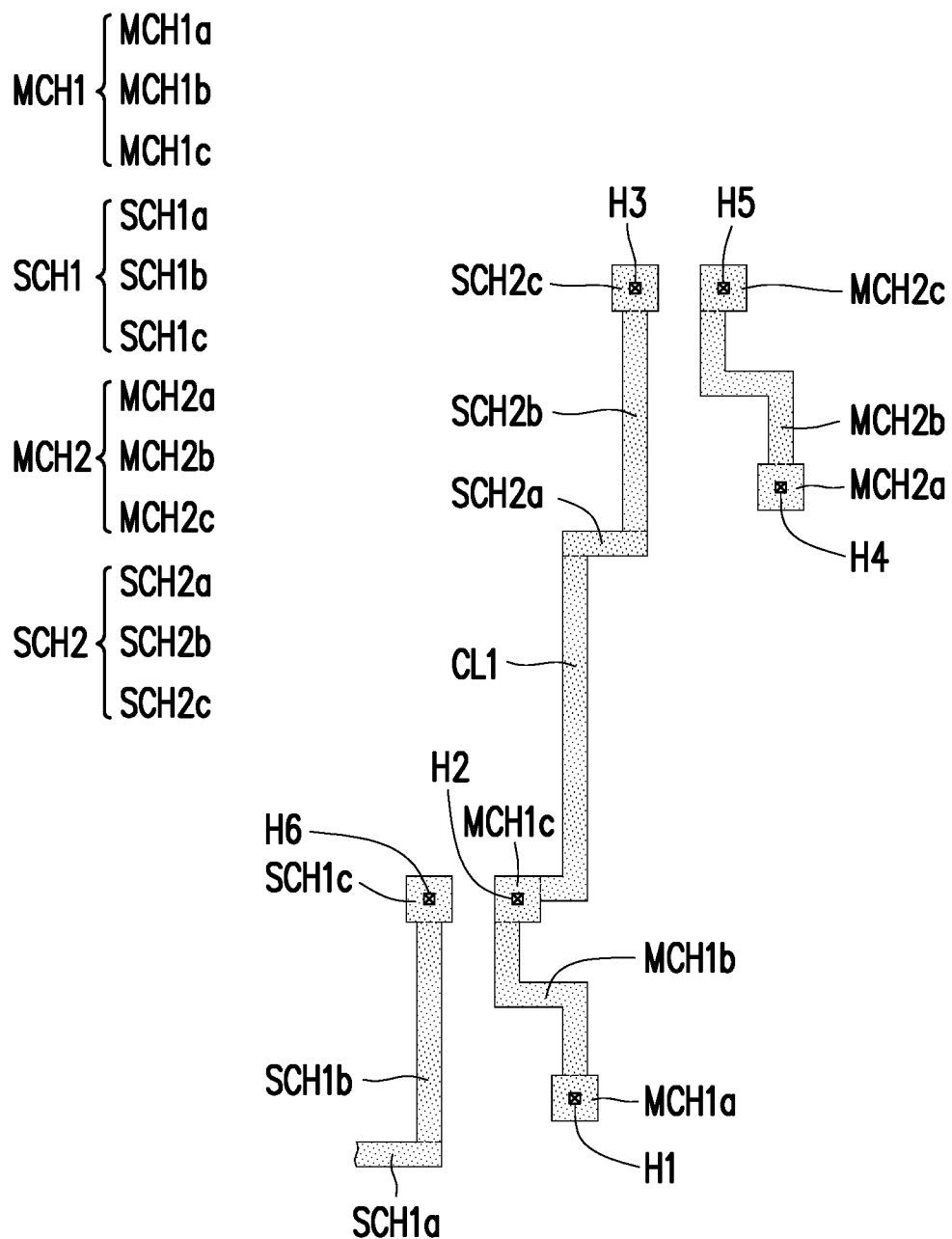
FIG. 3B is a schematic top view of channel layers, openings located on the channel layers, and connection line of the display device in FIG. 1.

FIG. 1 is a schematic top view of a display device according to the first embodiment of the disclosure, and some components of the display device are omitted in FIG. 1. FIG. 2A is a cross-sectional schematic view along a line A-A' depicted in FIG. 1. FIG. 2B is a cross-sectional schematic view along a section line B-B' depicted in FIG. 1. FIG. 3A is a schematic top view of pixel electrodes and openings located on the pixel electrodes of the display device in FIG. 1. FIG. 3B is a schematic top view of channel layers, openings located on the channel layers, and connection line of the display device in FIG. 1.

Referring to FIG. 1, FIG. 2A, FIG. 3A, and FIG. 3B, a display device 10 includes the first scan line SL1, the second scan line SL2, the first data line DL1, the first pixel unit PU1, the second pixel unit PU2, and the first connection line CL1. In some embodiments, the display device 10 further includes a substrate SB1, an opposite substrate SB2, a liquid crystal layer LC, a light-shielding layer SM, the first insulation layer GI, the second insulation layer ILD, the third insulation layer PL, a common electrode CE, the first protection layer BP1, the second protection layer BP2, an overcoat layer OC, a light conversion member T, a second data line DL2, and a black matrix BM.

The first pixel unit PU1 and the second pixel unit PU2 are located on the substrate SB1.

The first pixel unit PU1 includes the first main-active device MT1, the first sub-active device ST1, the first main-pixel electrode ME1, and the first sub-pixel electrode SE1. The second pixel unit PU2 includes the second main-active device MT2, the second sub-active device ST2, the second main-pixel electrode ME2, and the second sub-pixel electrode SE2.

The first main-active device MT1 is electrically connected with the first scan line SL1, the first data line DL1, and the first main-pixel electrode ME1. The first main-active device MT1 includes a gate MG1, a channel layer MCH1, a source MS1, and a drain MD1.

The channel layer MCH1 is located on the substrate SB1. In some embodiments, the light-shielding layer SM is sandwiched between a part of the channel layer MCH1 and the substrate SB1, but the disclosure is not limited thereto. The first insulation layer GI covers the channel layer MCH1 and the light-shielding layer SM. The gate MG1 and the first scan line SL1 are located on the first insulation layer GI, the gate MG1 is electrically connected with the first scan line SL1, and the channel layer MCH1 overlaps with the gate MG1. In the present embodiment, the channel layer MCH1 includes a source region MCH1a, a channel region MCH1b, and a drain region MCH1c sequentially connected (as shown in FIG. 3B). The channel region MCH1b overlaps with the gate MG1.

The second insulation layer ILD covers the gate MG1 and the first scan line SL1. The first data line DL1, the source MS1, and the drain MD1 are located on the second insulation layer ILD. The source MS1 and the drain MD1 are electrically connected with the source region MCH1a and the drain region MCH1c of the channel layer MCH1 through an opening H1 and an opening H2, respectively. The opening H1 and the opening H2 are located in the first insulation layer GI and the second insulation layer ILD as an example. The first data line DL1 is electrically connected with the source MS1. The third insulation layer PL covers the first data line DL1, the source MS1, and the drain MD1.

The second sub-active device ST2 is electrically connected with the first main-active device MT1, the second scan line SL2, and the second sub-pixel electrode SE2. The second sub-active device ST2 includes a gate SG2, a channel layer SCH2, and a drain SD2.

The channel layer SCH2 is located on the substrate SB1. In some embodiments, the light-shielding layer SM is sandwiched between a part of the channel layer SCH2 and the substrate SB1, but the disclosure is not limited thereto. The first insulation layer GI covers the channel layer SCH2 and the light-shielding layer SM. The gate SG2 and the second scan line SL2 are located on the first insulation layer GI, the gate SG2 is electrically connected with the second scan line SL2, and the channel layer SCH2 overlaps with the gate SG2. In the present embodiment, the channel layer SCH2 includes a source region SCH2a, a channel region SCH2b, and a drain region SCH2c sequentially connected (as shown in FIG. 3B). The channel region SCH2b overlaps with the gate SG2.

The second insulation layer ILD covers the gate SG2 and the second scan line SL2. The drain SD2 is located on the second insulation layer ILD. The drain SD2 is electrically connected with the drain region SCH2c of the channel layer SCH2 through an opening H3. The opening H3 is located in the first insulating layer GI and the second insulating layer ILD, for example. The third insulation layer PL covers the drain SD2.

The source region SCH2a of the channel layer SCH2 is connected with the first connection line CL1, and the source region SCH2a is electrically connected with the channel layer MCH1 of the first main-active device MT1 through the first connection line CL1. In other words, the first connection line CL1 electrically connect the first main-active device MT1 and the second sub-active device ST2 respectively disposed at two sides of the first data line DL1. The signals of the source region SCH2a of the second sub-active device ST2 are provided by the first main-active device MT1, thereby reducing the number of data lines.

In the present embodiment, the channel layer MCH1, the channel layer SCH2, and the first connection line CL1 belong to the same patterned conductive layer. The channel layer MCH1, the channel layer SCH2, and the first connection line CL1 is integrally formed, for example. In some embodiments, the channel layer MCH1, the channel layer SCH2, and the first connection line CL1 may be polycrystalline silicon, such as N-type doped low temperature polycrystalline silicon or P-type doped low temperature polycrystalline silicon, for example, and the disclosure is not limited thereto. In some other embodiments, the channel layer MCH1, the channel layer SCH2, and the first connection line CL1 may be metal oxide, such as indium zinc oxide, indium gallium zinc oxide, or other appropriate materials, or the combination thereof.

The second main-active device MT2 is electrically connected with the second scan line SL2, the second data line DL2, and the second main-pixel electrode ME2. The second main-active device MT2 includes a gate MG2, a channel layer MCH2, a source MS2, and a drain MD2. The second main-active device MT2 and the first main-active device MT1 have similar structure. In some embodiments, the second main-active device MT2 and the second sub-active device ST2 of the second pixel unit PU2 are respectively adjacent to the second data line DL2 and the first data line DL1.

The channel layer MCH2 is located on the substrate SB1. In some embodiments, the light-shielding layer SM is sandwiched between a part of the channel layer MCH2 and the substrate SB1, but the disclosure is not limited thereto. The first insulation layer GI covers the channel layer MCH2 and the light-shielding layer SM. The gate MG2 and the second scan line SL2 are located on the first insulation layer GI, the gate MG2 is electrically connected with the second scan line SL2, and the channel layer MCH2 overlaps with the gate MG2. In the present embodiment, the channel layer MCH2 includes a source region MCH2a, a channel region MCH2b, and a drain region MCH2c sequentially connected (as shown in FIG. 3B). The channel region MCH2b overlaps with the gate MG2. In some embodiments, the gate MG2 and the gate SG2 together form an I shape, thereby effectively preventing electric leakage in the active devices.

The second insulation layer ILD covers the gate MG2 and the second scan line SL2. The second data line DL2, the source MS2, and the drain MD2 are located on the second insulation layer ILD. The source MS2 and the drain MD2 are electrically connected with the source region MCH2a and the drain region MCH2c of the channel layer MCH2 through an opening H4 and an opening H5, respectively. The opening H4 and the opening H5 are located in the first insulation layer GI and the second insulation layer ILD as an example. The second data line DL2 is electrically connected with the source MS2. The third insulation layer PL covers the second data line DL2, the source MS2, and the drain MD2.

The first sub-active device ST1 is electrically connected with the first scan line SL1 and the first sub-pixel electrode SE1. The first sub-active device ST1 includes a gate SG1, a channel layer SCH1, and a drain SD1. The first sub-active device ST1 and the second sub-active device ST2 have similar structure.

The channel layer SCH1 is located on the substrate SB1. In some embodiments, the light-shielding layer SM is sandwiched between a part of the channel layer SCH1 and the substrate SB1, but the disclosure is not limited thereto. The first insulation layer GI covers the channel layer SCH1 and the light-shielding layer SM. The gate SG1 and the first scan line SL1 are located on the first insulation layer GI, the gate SG1 is electrically connected with the first scan line SL1, and the channel layer SCH1 overlaps with the gate SG1. In the present embodiment, the channel layer SCH1 includes a source region SCH1a, a channel region SCH1b, and a drain region SCH1c sequentially connected (as shown in FIG. 3B). The channel region SCH1b overlaps with the gate SG1. In some embodiments, the gate MG1 and the gate SG1 together form an I shape, thereby effectively preventing electric leakage in the active devices.

The second insulation layer ILD covers the gate SG1 and the first scan line SL1. The drain SD1 is located on the second insulation layer ILD. The drain SD1 is electrically connected with the channel layer SCH1 through an opening H6, and the opening H6 is located in the first insulation layer GI and the second insulation layer ILD as an example. The third insulation layer PL covers the drain SD1.

The source region SCH1a of the channel layer SCH1 is electrically connected to channel layers of other main-active devices (not shown). In other words, the signals of the source region SCH1a of the first sub-active device ST1 are provided by other main-active devices, thereby reducing the number of data lines.

The common electrode CE (shown in FIG. 2A and FIG. 2B) is located on the third insulation layer PL. In some embodiments, the common electrode CE has an opening corresponding to the first main-active device MT1, the first sub-active device ST1, the second main-active device MT2, and the second sub-active device ST2, but the disclosure is not limited thereto.

The first protection layer BP1 is located on the common electrode CE and the third insulation layer PL.

The first sub-pixel electrode SE1 and the second sub-pixel electrode SE2 are located on the first protection layer BP1. The common electrode CE overlaps with the first sub-pixel electrode SE1 and the second sub-pixel electrode SE2. The first sub-pixel electrode SE1 is electrically connected with the drain SD1 of the first sub-active device ST1 through an opening OP1, and the opening OP1 is located in the first protection layer BP1 and the third insulation layer PL as an example. The second sub-pixel electrode SE2 is electrically connected with the drain SD2 of the second sub-active device ST2 through an opening OP2, and the opening OP2 is located in the first protection layer BP1 and the third insulation layer PL as an example.

Referring to FIG. 3A, the first sub-pixel electrode SE1 includes a main portion SEM1 and a plurality of branching portions SEB1. Each of the branching portions SEB1 includes the first connecting portion P1, the second connecting portion P2, and the third connecting portion P3 sequentially connected (as shown in FIG. 3A). The first connecting portion P1 is connected to the main portion SEM1, and the extending direction of the second connecting portion P2 is different from the extending direction of the first connecting portion P1 and the extending direction of the third connecting portion P3.

In the present embodiment, the first sub-pixel electrode SE1 and the second sub-pixel electrode SE2 have similar structure.

The second protection layer BP2 covers the first sub-pixel electrode SE1, the second sub-pixel electrode SE2, and the first protection layer BP1.

The first main-pixel electrode ME1 and the second main-pixel electrode ME2 are located on the second protection layer BP2. The first main-pixel electrode ME1 and the second main-pixel electrode ME2 overlap the common electrode CE. The first main-pixel electrode ME1 is electrically connected with the drain MD1 of the first main-active device MT1 through an opening OP3, and the opening OP3 is located in the second protection layer BP2, the first protection layer BP1, and the third insulation layer PL as an example. The second main-pixel electrode ME2 is electrically connected with the drain MD2 of the second main-active device MT2 through an opening OP4, and the opening OP4 is located in the second protection layer BP2, the first protection layer BP1, and the third insulation layer PL as an example.

Referring to FIG. 3A, the first main-pixel electrode ME1 includes a main portion MEM1 and a plurality of branching portions MEB1. The plurality of branching portions MEB1 are connected to the main portion MEM1. The width of the branching portion MEB1 decreases in a direction away from the main portion MEM1. The main portion MEM1 of the first main-pixel electrode ME1 and the main portion SEM1 of the first sub-pixel electrode SE1 are respectively disposed at two opposite sides of the first pixel unit PU1, and the branching portions MEB1 of the first main-pixel electrode ME1 and the branching portions SEB1 of the first sub-pixel electrode SE1 are extended in opposite directions and are alternately arranged.

In the present embodiment, the first main-pixel electrode ME1 and the second main-pixel electrode ME2 have similar structure. Similarly, the branching portions of the second main-pixel electrode ME2 and the branching portions of the second sub-pixel electrode SE2 are alternately arranged.

The first pixel unit PU1 includes at least two types of operating mode. The first type of operating mode is that the first voltage V1 is applied to the first main-pixel electrode ME1 and the first sub-pixel electrode SE1 at the same time, and a common voltage Vcom is applied to the common electrode CE. The second type of operating mode is that the second voltage V2 is applied to the first main-pixel electrode ME1, and the common voltage Vcom is applied to the first sub-pixel electrode SE1 and the common electrode CE. Since the shape of the first main-pixel electrode ME1 is different from the shape of the first sub-pixel electrode SE1, the corresponding liquid crystal response time of the first pixel unit PU1 is different under two types of operating mode. Therefore, the type of operating mode of the first pixel unit PU1 can be selected according to the requirement of the liquid crystal response time. In the present embodiment, the first type of operating mode of the first pixel unit PU1 is corresponding to a higher penetration rate, and the second type of operating mode of the first pixel unit PU1 is corresponding to a shorter liquid crystal response time.

The second pixel unit PU2 includes at least two types of operating mode. The first type of operating mode is that the first voltage V1 is applied to the second main-pixel electrode ME2 and the second sub-pixel electrode SE2 at the same time, and a common voltage Vcom is applied to the common electrode CE. The second type of operating mode is that the second voltage V2 is applied to the second main-pixel electrode ME2, and the common voltage Vcom is applied to the second sub-pixel electrode SE2 and the common electrode CE. Since the shape of the second main-pixel electrode ME2 is different from the shape of the second sub-pixel electrode SE2, the corresponding liquid crystal response time of the second pixel unit PU2 is different under two types of operating mode. Therefore, the type of operating mode of the second pixel unit PU2 can be selected according to the requirement of the liquid crystal response time. In the present embodiment, the first type of operating mode of the second pixel unit PU2 is corresponding to a higher penetration rate, and the second type of operating mode of the second pixel unit PU2 is corresponding to a shorter liquid crystal response time.

The liquid crystal layer LC is located on the second protection layer BP2, the first main-pixel electrode ME1, and the second main-pixel electrode ME2. In addition, the liquid crystal layer LC is located between the substrate SB1 and the opposite substrate SB2.

The light conversion member T and the black matrix BM are located on the opposite substrate SB2. In some embodiments, the light conversion member T includes fluorescent material, light-filtering material, quantum dot material, or other appropriate materials, or the combination thereof. The light conversion member T includes a red light conversion element, green light conversion element, and blue light conversion element, for example. The black matrix BM is located between the light conversion members T with different color.

The overcoat layer OC is located on the light conversion member T. The overcoat layer OC is located between the light conversion member T and the liquid crystal layer LC.

Figure 4:
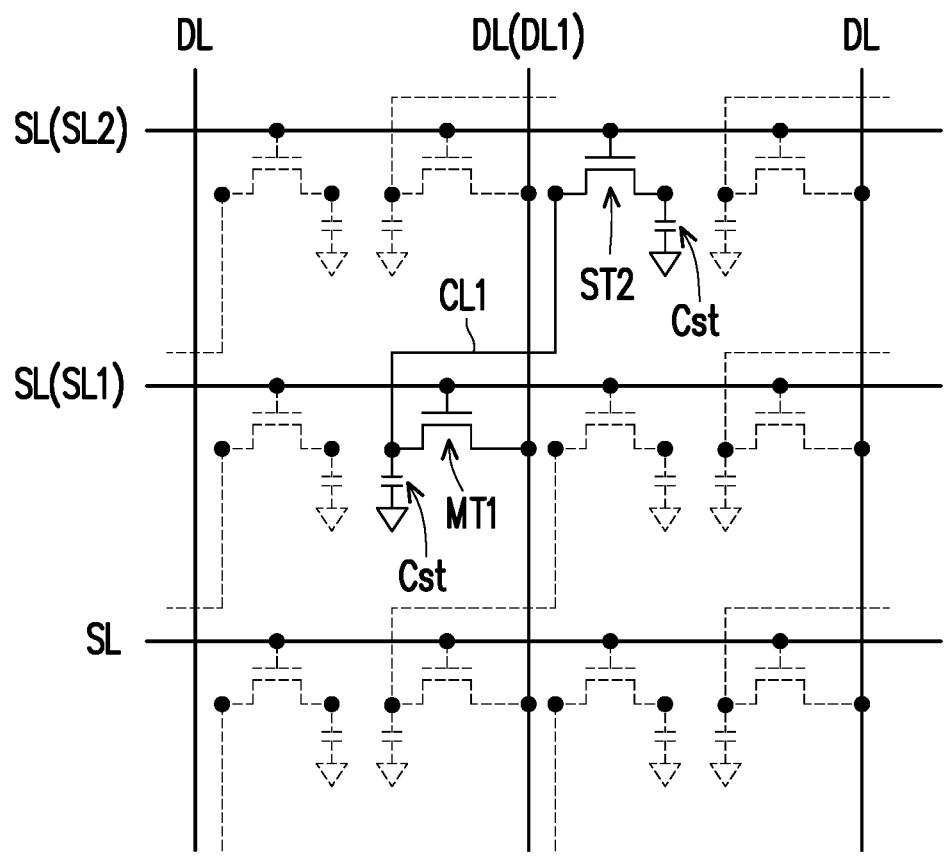
FIG. 4 is a partial schematic circuit diagram of the display device according to the first embodiment of the disclosure.
Figure 5A:
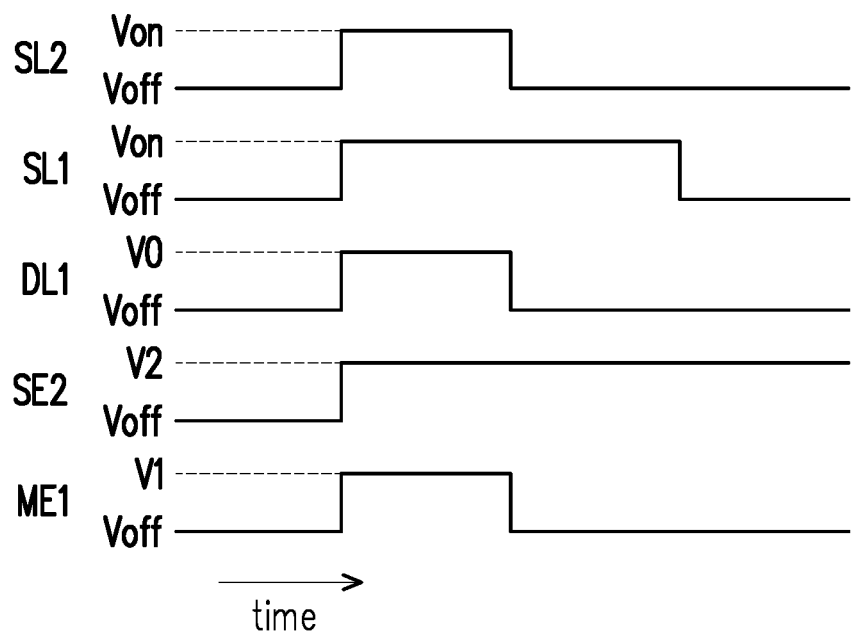
FIG. 5A is a schematic view of an operation method of a pixel unit according to the first embodiment of the disclosure.
Figure 5B:
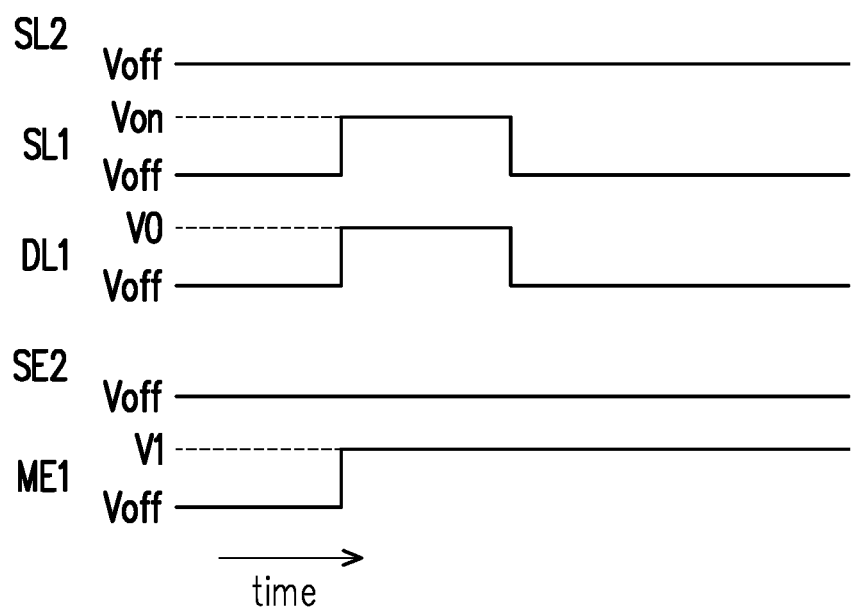
FIG. 5B is a schematic view of an operation method of a pixel unit according to the first embodiment of the disclosure.

FIG. 4 is a partial schematic circuit diagram of the display device according to the first embodiment of the disclosure. FIG. 5A is a schematic view of an operation method of pixel unit according to the first embodiment of the disclosure. FIG. 5B is a schematic view of an operation method of pixel unit according to the first embodiment of the disclosure. In FIG. 5A and FIG. 5B, the horizontal axes represent time, and the vertical axes represent voltages applied to different components.

Referring to FIG. 4, the first main-active device MT1, the second sub-active device ST2, and the first connection line CL1 together form a repeat unit RUa and are electrically connected to the scan lines SL (such as the first scan line SL1 and the second scan line SL2 in FIG. 1) and the data line DL (such as the first data line DL1 in FIG. 1), correspondingly. Each of the first main-active device MT1 and the second sub-active device ST2 is electrically connected to the corresponding capacitor Cst. In FIG. 4, other active devices and connecting lines and storage capacitors connected to those other active devices surrounding the repeat unit RUa are represented by dotted line.

Referring to FIG. 1, FIG. 4, and FIG. 5A, the method of operating the second sub-pixel electrode SE2 is described hereinafter. Firstly, a voltage is applied to the first scan line SL1 and the first data line DL1 to active the first main-active device MT1, for example, a voltage Von is applied to the first scan line SL1 and a voltage V0 is applied to the first data line DL1. At the same time, the voltage Von is applied to the second scan line SL2 to activate the second sub-active device ST2. Since the first connection line CL1 is electrically connected with the channel layer MCH1 of the first main-active device MT1 and the channel layer SCH2 of the second sub-active device ST2, voltages are applied to the first main-pixel electrode ME1 and the second sub-pixel electrode SE2 at the same time. For example, a voltage V1 is applied to the first main-pixel electrode ME1, and a voltage V2 is applied to the second sub-pixel electrode SE2. After the first main-active device MT1 and the second sub-active device ST2 are activated for a while, the voltages applied to the second scan line SL2 and the first data line DL1 are stopped to deactivate the second sub-active device ST2 (the voltage is changed to voltage Voff). Since the second sub-pixel electrode SE2 is electrically connected to the capacitor Cst (because of capacitance generated by the voltage difference between the second sub-pixel electrode SE2 and the common electrode CE, as an example), even though the second sub-active device ST2 is deactivated, the voltage V2 (the second voltage) on the second sub-pixel electrode SE2 remains for a period of time. In some embodiments, the voltage applied to the second scan line SL2 is stopped first to deactivate the second sub-active device ST2, at this time, the voltage of the second sub-pixel electrode SE2 remains. In another embodiment, an opposite voltage is applied to the first data line DL1 to eliminate the voltage remaining on the first main-pixel electrode ME1. Finally, the voltage applied to the first data line DL1 and the first scan line SL1 is stopped. Since the second sub-active device ST2 is in deactivated state, the opposite voltage is not applied to the second sub-pixel electrode SE2, so that the voltage remaining on the second sub-pixel electrode SE2 is not eliminated.

In the first embodiment, the first sub-pixel electrode SE1 may be operated in a manner similar to the second sub-pixel electrode SE2 in FIG. 5A. However, the second sub-pixel electrode SE2 is driven by the first main-active device MT1 and the second sub-active device ST2, and the first sub-pixel electrode SE1 is driven by main-active devices of other pixel units (not shown) and the first sub-active device ST1.

Referring to FIG. 1, FIG. 4, and FIG. 5, the method of operating the first main-pixel electrode ME1 is described hereinafter. Firstly, the voltage Von is applied to the first scan line SL1 and the voltage V0 is applied to the first data line DL1 to activate the first main-active device MT1, and the first voltage (voltage V1) is applied to the first main-pixel electrode ME1. At the same time, the voltage Von is not applied to the second scan line SL2, or a smaller voltage is applied to the second scan line SL2. After the first main-active device MT1 is activated for a while, the voltages applied to the first scan line SL1 and the first data line DL1 are stopped to deactivate the first main-active device MT1. Since the first main-pixel electrode ME1 is electrically connected to the capacitor Cst (because of capacitance generated by the voltage difference between the first main-pixel electrode ME1 and the common electrode CE, as an example), even though the first main-active device MT1 is deactivated, the voltage V1 (the first voltage) on the first main-pixel electrode ME1 remains for a period of time.

In the first embodiment, the second main-pixel electrode ME2 may be operated in a manner similar to the first main-pixel electrode ME1 in FIG. 5B. However, the first main-pixel electrode ME1 is driven by the first main-active device MT1 electrically connected to the first scan line SL1 and the first data line DL1, and the second main-pixel electrode ME2 is driven by the second main-active device MT2 electrically connected to the second scan line SL2 and the second data line DL2.

Based on the above, in the present embodiment, the time difference may be used to selectively activate the sub-pixel electrode or the main-pixel electrode in the pixel units. In this way, the type of operating mode of the pixel unit is selected according to the requirement of the liquid crystal response time.

Figure 6:
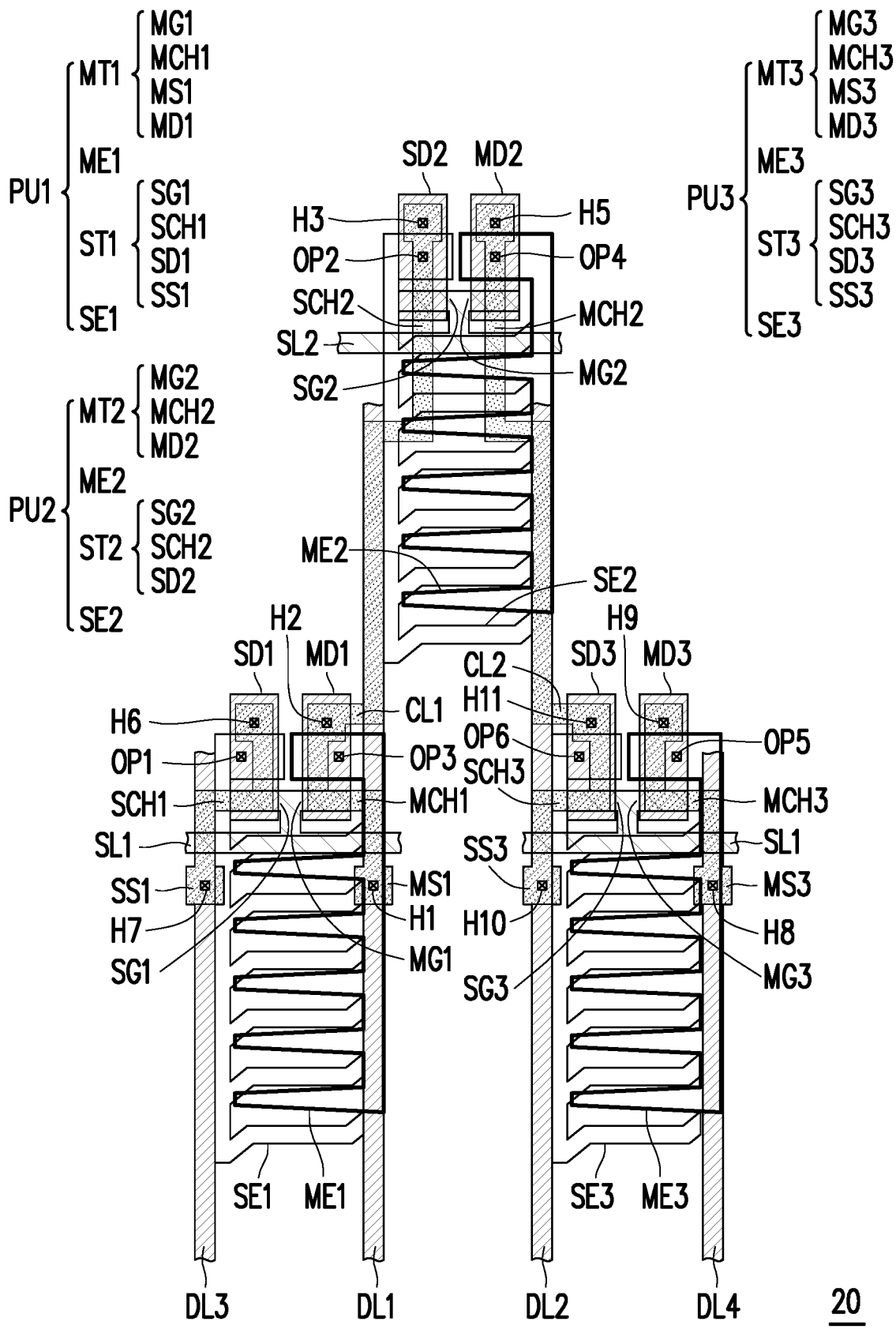
FIG. 6 is schematic a top view of a display device according to the second embodiment of the disclosure.
Figure 7:
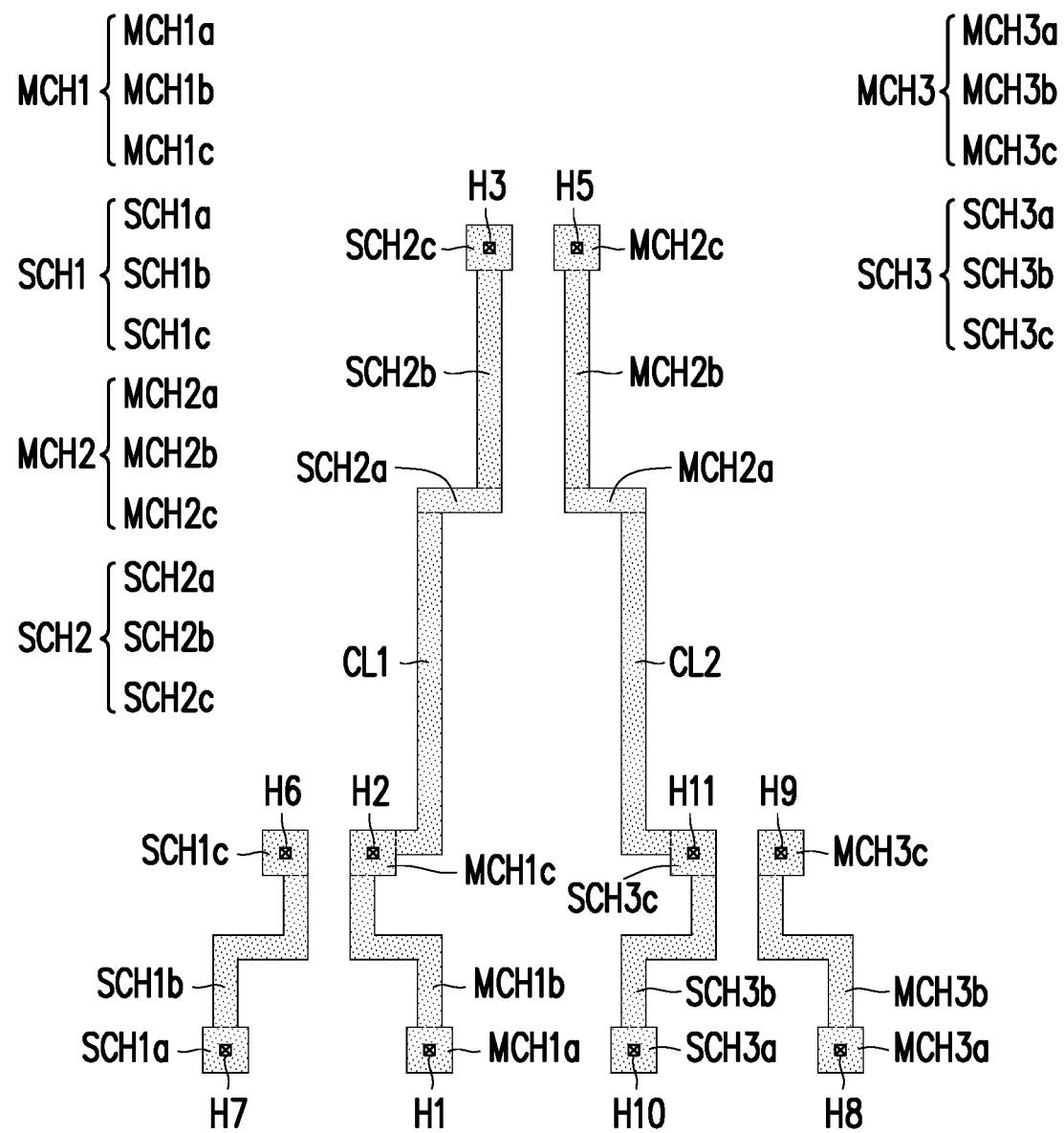
FIG. 7 is a schematic top view of channel layers, openings located on the channel layers, and connection line of the display device in FIG. 6.

FIG. 6 is a schematic top view of a display device according to the second embodiment of the disclosure, and some components of the display device are omitted in FIG. 6. FIG. 7 is a schematic top view of channel layers, openings located on the channel layers, and connection line of the display device in FIG. 6.

It should be noted here, the second embodiment in FIG. 6 utilizes component labels and partial content from the first embodiment, wherein identical or similar elements are labeled with identical or similar labels, and therefore description of similar technical content will be omitted. Regarding the description of the omitted parts, reference may be made to the previous embodiment, and will not be repeated.

The difference between the second embodiment and the first embodiment is that a display device 20 of the second embodiment further includes the third data line DL3, the fourth data line DL4, the third pixel unit PU3, and the second connection line CL2.

Referring to FIG. 6, in the second embodiment, the first main-active device MT1 is electrically connected to the first scan line SL1, the first data line DL1, and the second sub-active device ST2. The first sub-active device ST1 is electrically connected with the first scan line SL1 and the third data line DL3. The second main-active device MT2 is electrically connected with the second scan line SL2. The second sub-active device ST2 is electrically connected with the second scan line SL2. The third main-active device MT3 is electrically connected with the first scan line SL1 and the fourth data line DL4. The third sub-active device ST3 is electrically connected with the first scan line SL1, the second data line DL2, and the second main-active device MT2. In the second embodiment, the third data line DL3, the first data line DL1, the second data line DL2, and the fourth data line DL4 are sequentially disposed in parallel. In other words, the first data line DL1 is disposed between the third data line DL3 and the second data line DL2, and the second data line DL2 is disposed between the first data line DL1 and the fourth data line DL4.

In the second embodiment, the structure of the first sub-active device ST1 is different from the structure of the second sub-active device ST2, and the first sub-active device ST1 further includes a source SS1. The third data line DL3 is electrically connected to the source SS1 of the first sub-active device ST1, the source SS1 is electrically connected to the source region SCH1a (shown in FIG. 7) of the channel layer SCH1 through an opening H7, and the opening H7 is located in the first insulation layer GI and the second insulation layer ILD as an example.

In the second embodiment, the structure of the second main-active device MT2 is different from the structure of the first main-active device MT1. In the second embodiment, the second main-active device MT2 does not include the source MS2, and the source region MCH2a of the channel layer MCH2 of the second main-active device MT2 is connected to the second connection line CL2.

The third pixel unit PU3 includes the third main-active device MT3, the third sub-active device ST3, the third main-pixel electrode ME3, and the third sub-pixel electrode SE3.

The third main-active device MT3 is electrically connected with the first scan line SL1 and the fourth data line DL4. In the second embodiment, the third main-active device MT3 and the first main-active device MT1 have similar structure. In some embodiments, the third main-active device MT3 and the third sub-active device ST3 of the third pixel unit PU3 are respectively adjacent to the fourth data line DL4 and the second data line DL2.

The third main-active device MT3 includes a gate MG3, a channel layer MCH3, a source MS3, and a drain MD3.

The channel layer MCH3 is located on the substrate. In some embodiments, the light-shielding layer is sandwiched between a part of the channel layer MCH3 and the substrate, but the disclosure is not limited thereto. The first insulation layer GI covers the channel layer MCH3 and the light-shielding layer. The gate MG3 and the first scan line SL1 are located on the first insulation layer GI, the gate MG3 is electrically connected with the first scan line SL1, and the channel layer MCH3 overlaps with the gate MG3. In the present embodiment, the channel layer MCH3 includes a source region MCH3a, a channel region MCH3b, and a drain region MCH3c sequentially connected (as shown in FIG. 7). The channel region MCH3b overlaps with the gate MG3. In some embodiments, the channel layer MCH1, the channel layer SCH2, the channel layer MCH2, the channel layer MCH3, the first connection line CL1, and the second connection line CL2 may be polycrystalline silicon, such as N-type doped low temperature polycrystalline silicon or P-type doped low temperature polycrystalline silicon, for example, and is not limited thereto. In some other embodiments, the channel layer MCH1, the channel layer SCH2, and the first connection line CL1 are may be metal oxide, such as indium zinc oxide, indium gallium zinc oxide, or other appropriate materials, or the combination thereof.

The second insulation layer ILD covers the gate MG3 and the first scan line SL1. The fourth data line DL4, the source MS3, and the drain MD3 are located on the second insulation layer. The source MS3 and the drain MD3 are electrically connected with the source region MCH3a and the drain region MCH3c of the channel layer MCH3 through an opening H8 and an opening H9, respectively. The opening H8 and the opening H9 are located in the first insulation layer GI and the second insulation layer ILD as an example. The fourth data line DL4 is electrically connected with the source MS3. The third insulation layer covers the fourth data line DL4, the source MS3, and the drain MD3.

The third sub-active device ST3 is electrically connected with the first scan line SL1, the second data line DL2, and the channel layer MCH2 of the second main-active device MT2. In the second embodiment, the third sub-active device ST3 and the first sub-active device ST1 have similar structure.

The third sub-active device ST3 includes a gate SG3, a channel layer SCH3, a source SS3, and a drain SD3.

The channel layer SCH3 is located on the substrate SB1. In some embodiments, the light-shielding layer SM is sandwiched between a part of the channel layer SCH3 and the substrate SB1, but the disclosure is not limited thereto. The first insulation layer GI covers the channel layer SCH3 and the light-shielding layer SM. The gate SG3 and the first scan line SL1 are located on the first insulation layer GI, the gate SG3 is electrically connected with the first scan line SL1, and the channel layer SCH3 overlaps with the gate SG3. In the present embodiment, the channel layer SCH3 includes a source region SCH3a, a channel region SCH3b, and a drain region SCH3c sequentially connected (as shown in FIG. 7). The channel region SCH3b overlaps with the gate SG3. In some embodiments, the gate MG3 and the gate SG3 together form an I shape, thereby effectively preventing electric leakage in the active devices.

The second insulation layer covers the gate SG3 and the first scan line SL1. The second data line DL2, the source SS3, and the drain SD3 are located on the second insulation layer. The source SS3 and the drain SD3 are electrically connected with the channel layer SCH3 through an opening H10 and an opening H11, respectively. The opening H10 and the opening H11 are located in the first insulation layer GI and the second insulation layer ILD as an example. The second data line DL2 is electrically connected with the source SS3. The third insulation layer covers the second data line DL2, the source SS3, and the drain SD3.

In the present embodiment, the second connection line CL2 is electrically connected with the third sub-active device ST3 and the second main-active device MT2. For example, the second connection line CL2 is electrically connected with the channel layer SCH3 of the third sub-active device ST3 and the source region MCH2a of the channel layer MCH2 of the second main-active device MT2. In other words, the second connection line CL2 is electrically connected to the third sub-active device ST3 and the second main-active device MT2 which are respectively disposed at two opposite sides of the second data line DL2, the signals of the source region MCH2a of the second main-active device MT2 are provided by the third sub-active device ST3, thereby reducing the number of data lines.

In the second embodiment, the first main-pixel electrode ME1, the second main-pixel electrode ME2, and the third main-pixel electrode ME3 have the same shape, and the first sub-pixel electrode SE1, the second sub-pixel electrode SE2, and the third sub-pixel electrode SE3 have the same shape. The shape of the third main-pixel electrode ME3 is different from the shape of the third sub-pixel electrode SE3.

The third main-pixel electrode ME3 is electrically connected with the drain MD3 of the third main-active device MT3 through an opening OP5. The third sub-pixel electrode SE3 is electrically connected with the drain SD3 of the third sub-active device ST3 through an opening OP6. The opening OP5 and the opening OP6 are similar to the opening OP3 and the opening OP1, for example. The operation method of the third main-pixel electrode ME3 is similar to the operation method in FIG. 5B. However, the third main-pixel electrode ME3 of the third pixel unit PU3 is mainly operated by the first scan line SL1 and the fourth data line DL4.

Figure 8:
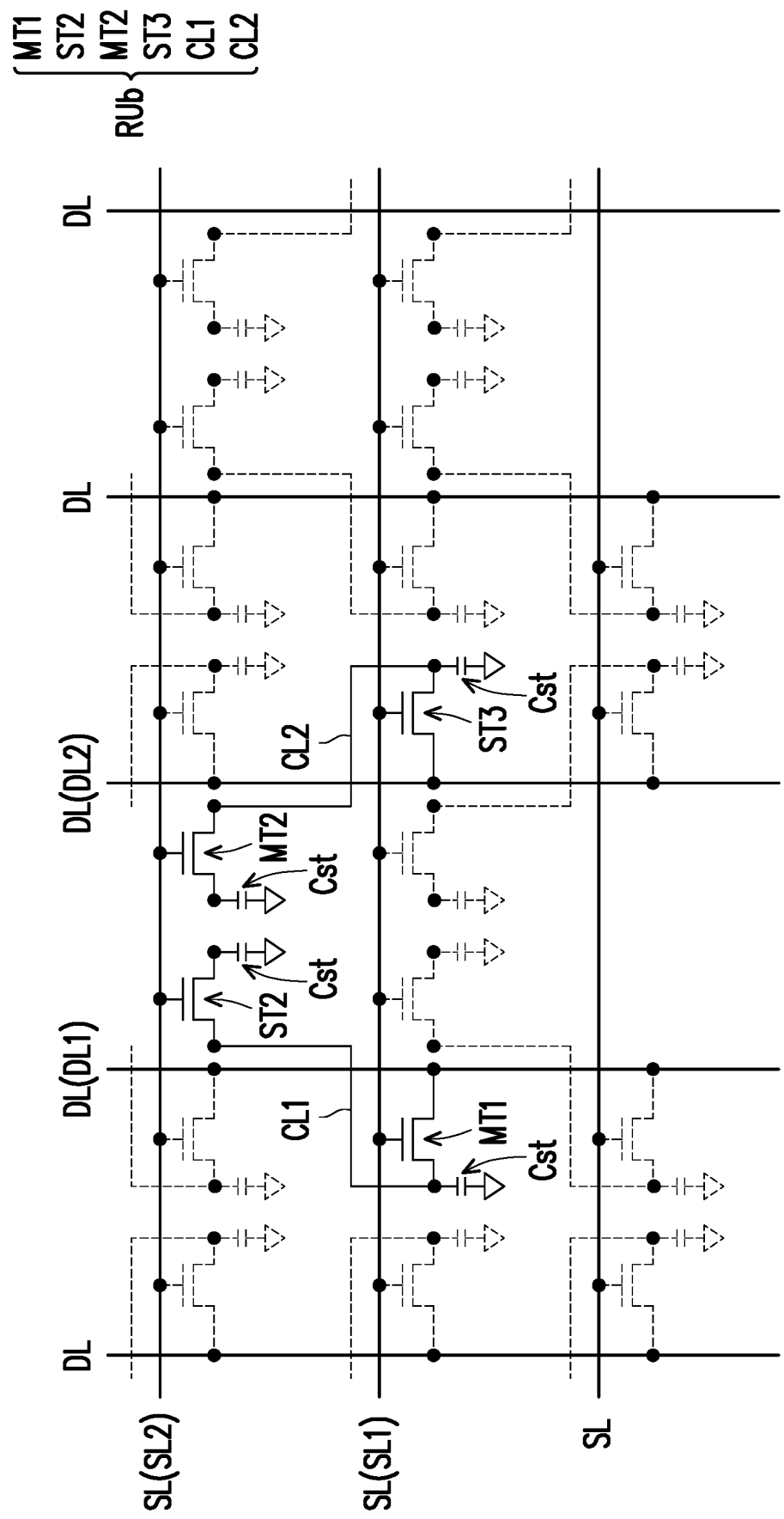
FIG. 8 is a partial schematic circuit diagram of the display device according to the second embodiment of the disclosure.

FIG. 8 is a partial schematic circuit diagram of the display device according to the second embodiment of the disclosure.

Referring to FIG. 6 and FIG. 8, the first main-active device MT1, the second sub-active device ST2, the second main-active device MT2, the third sub-active device ST3, the first connection line CL1, and the second connection line CL2 together form a repeat unit RUb and are electrically connected to the first scan line SL1, the second scan line SL2, the first data line DL1, and the second data line DL2, correspondingly. In FIG. 8, other active devices and connecting lines and storage capacitors connected to those other active devices surrounding the repeat unit RUb are represented by dotted line.

Referring to FIG. 6 and FIG. 8, in the second embodiment, the operation method of the third sub-pixel electrode SE3 is similar to the operation method in FIG. 5B. However, the third sub-pixel electrode SE3 is mainly operated by the third sub-active device ST3 electrically connected to the first scan line SL1 and the second data line DL2.

In the second embodiment, the method of operating the second main-pixel electrode ME2 of the second pixel unit PU2 is described hereinafter. Firstly, the voltage is applied to the first scan line SL1 and the second data line DL2 to activate the third sub-active device ST3. At the same time, the voltage is applied to the second scan line SL2 to activate the second main-active device MT2. Since the second connection line CL2 is electrically connected with the channel layer SCH3 of the third sub-active device ST3 and the channel layer MCH2 of the second main-active device MT2, voltages are applied to the third sub-pixel electrode SE3 and the second main-pixel electrode ME2 at the same time. After the third sub-active device ST3 is activated for a while, the voltages applied to the second scan line SL2 and the second data line DL2 are stopped to deactivate the second main-active device MT2. Since the second main-pixel electrode ME2 is electrically connected to the capacitor Cst (because of capacitance generated by the voltage difference between the second main-pixel electrode ME2 and the common electrode CE, as an example), even though the second main-active device MT2 is deactivated, the voltage on the second main-pixel electrode ME2 remains for a period of time. In some embodiments, the voltage applied to the second scan line SL2 is stopped first to deactivate the second main-active device MT2. At this time, the voltage of the second main-pixel electrode ME2 remains. In another embodiment, an opposite voltage is applied to the second data line DL2 to eliminate the voltage remaining on the third sub-pixel electrode SE3. Finally, the voltage applied to the second data line DL2 and the first scan line SL1 is stopped. Since the second main-active device MT2 is in deactivated state, the opposite voltage is not applied to the second main-pixel electrode ME2, so that the voltage remaining on the second main-pixel electrode ME2 is not eliminated. The operation method of the second main-pixel electrode ME2 may be similar to the operation method in FIG. 5A. However, the second main-pixel electrode ME2 of the second pixel unit PU2 is mainly operated by the third sub-active device ST3 electrically connected to the first scan line SL1 and the second data line DL2, and by the second main-active device MT2 electrically connected to the second scan line SL2 and the second data line DL2.

In the second embodiment, the second sub-pixel electrode SE2 is operated in a manner similar to the embodiment in FIG. 5A, and will not be repeated.

In the second embodiment, the first main-pixel electrode ME1 is operated in a manner similar to the embodiment in FIG. 5B, and will not be repeated.

In the second embodiment, the method of operating the first sub-pixel electrode SE1 is described hereinafter. Firstly, a voltage is applied to the first scan line SL1 and the third data line DL3 to active the first sub-active device ST1, and the second voltage is applied to the first sub-pixel electrode SE1. At the same time, there is no voltage applied to the second scan line SL2, or a smaller voltage is applied to the second scan line SL2. After the first sub-active device ST1 is activated for a while, the voltages applied to the first scan line SL1 and the third data line DL3 are stopped to deactivate the first sub-active device ST1. Since the first sub-pixel electrode SE1 is electrically connected to the capacitor Cst (because of capacitance generated by the voltage difference between the first sub-pixel electrode SE1 and the common electrode CE, as an example), even though the first sub-active device ST1 is deactivated, the voltage of the first sub-pixel electrode SE1 remains for a period of time. The operation method of the first sub-pixel electrode SE1 is similar to the operation method in FIG. 5B. However, the first sub-pixel electrode SE1 is mainly operated by the first sub-active device ST1 electrically connected to the first scan line SL1 and the third data line DL3.

Figure 9:
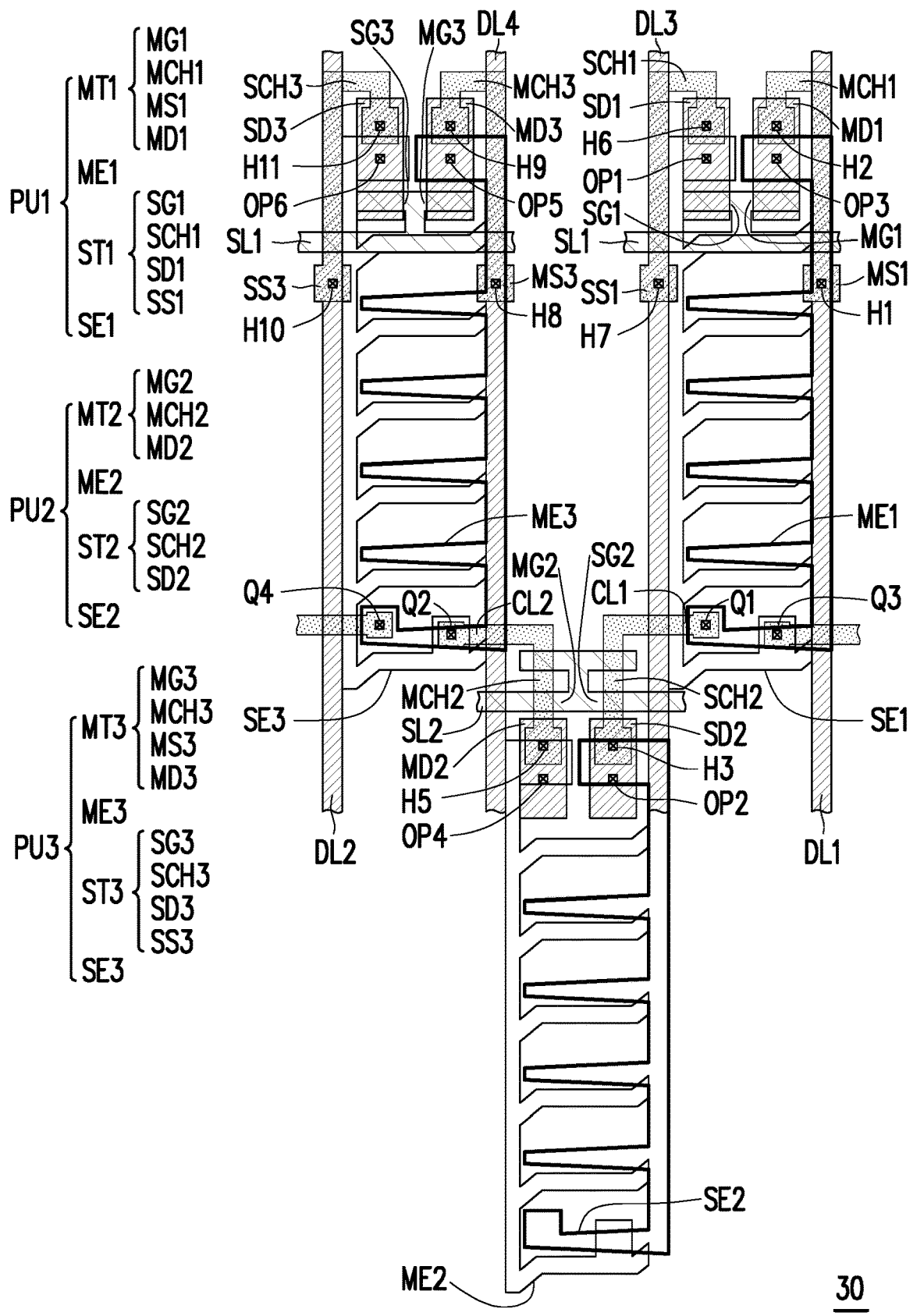
FIG. 9 is a schematic top view of a display device according to the third embodiment of the disclosure.
Figure 10A:
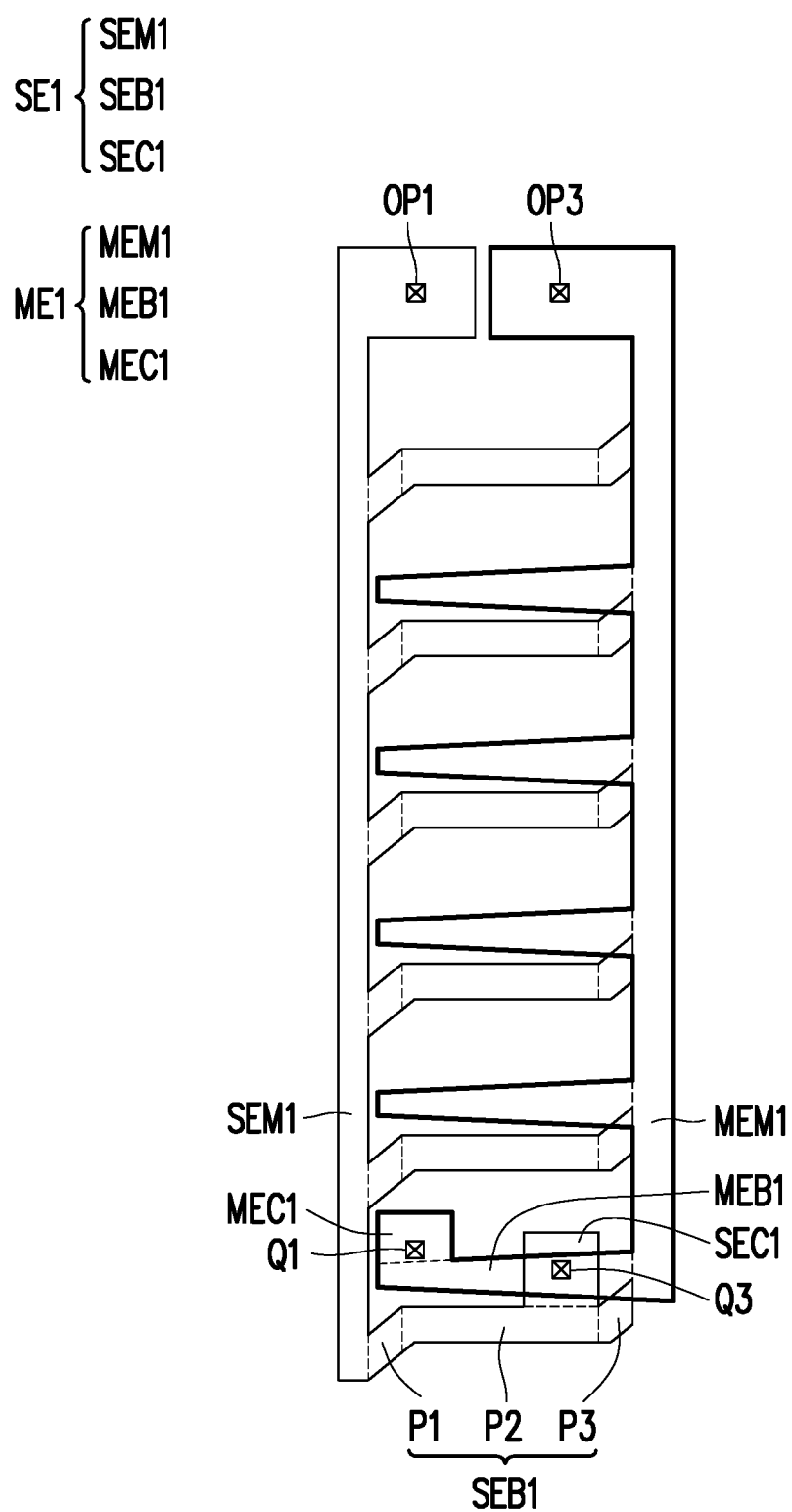
FIG. 10A is a schematic top view of pixel electrodes and openings located on the pixel electrodes of the display device in FIG. 9.
Figure 10B:
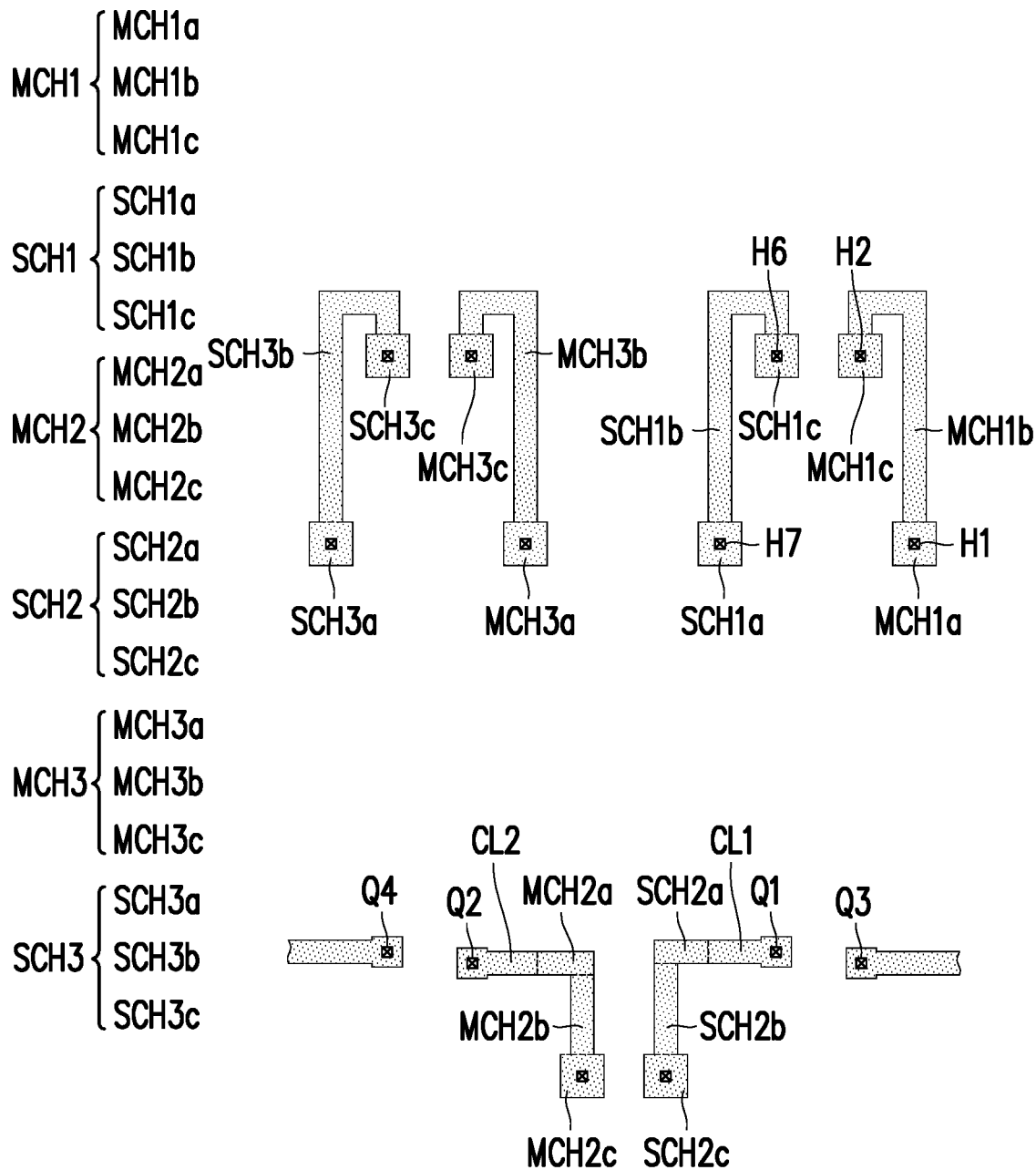
FIG. 10B is a schematic top view of channel layers, openings located on the channel layers, and connection line of the display device in FIG. 9.

FIG. 9 is a schematic top view of a display device according to the third embodiment of the disclosure, and some components of the display device are omitted in FIG. 9. FIG. 10A is a schematic top view of pixel electrodes and openings located on the pixel electrodes of the display device in FIG. 9. FIG. 10B is a schematic top view of channel layers, openings located on the channel layers, and connection line of the display device in FIG. 9.

It should be noted here, the third embodiment in FIG. 9 utilizes component labels and partial content from the second embodiment, wherein identical or similar elements are labeled with identical or similar labels, and therefore description of similar technical content will be omitted. Regarding the description of the omitted parts, reference may be made to the previous embodiment, and will not be repeated.

The main differences between the third embodiment and the second embodiment are that, in the display device 30 of the third embodiment, the first main-pixel electrode ME1, the second sub-pixel electrode SE2, and the third main-pixel electrode ME3 have the same shape, and the first sub-pixel electrode SE1, the second main-pixel electrode ME2, and the third sub-pixel electrode SE3 have the same shape.

In the third embodiment, the first main-pixel electrode ME1, the second sub-pixel electrode SE2, and the third main-pixel electrode ME3 are formed in the same patterning process as an example, and the first sub-pixel electrode SE1, the second main-pixel electrode ME2, and the third sub-pixel electrode SE3 are formed in the same patterning process as an example. In the third embodiment, the second sub-pixel electrode SE2 is electrically connected to the drain SD2 of the second sub-active device ST2 through the opening OP2, the opening OP2 is located in the second protection layer BP2, the first protection layer BP1, and the third insulation layer PL as an example. The second main-pixel electrode ME2 is electrically connected to the drain MD2 of the second main-active device MT2 through the opening OP4, and the opening OP4 is located in the first protection layer BP1 and the third insulation layer PL as an example.

In the third embodiment, the first main-active device MT1 is electrically connected to the first scan line SL1, the first data line DL1, and the second sub-active device ST2. The first sub-active device ST1 is electrically connected with the first scan line SL1 and the third data line DL3. The third main-active device MT3 is electrically connected with the first scan line SL1 and the fourth data line DL4. The third sub-active device ST3 is electrically connected with the first scan line SL1 and the second data line DL2. The second main-active device MT2 is electrically connected to the second scan line SL2 and the third sub-active device ST3, and the second sub-active device ST2 is electrically connected to the second scan line SL2 and the first main-active device MT1. In the third embodiment, the first data line DL1, the third data line DL3, the fourth data line DL4, and the second data line DL2 are sequentially disposed in parallel. In other words, the third data line DL3 is disposed between the first data line DL1 and the fourth data line DL4, and the fourth data line DL4 is disposed between the third data line DL3 and the second data line DL2.

Referring to FIG. 9, the first connection line CL1 is electrically connected between the first main-pixel electrode ME1 and the channel layer SCH2 of the second sub-active device ST2 disposed on two opposite sides of the third data line DL3. In the third embodiment, the first connection line CL1 and the channel layer MCH1 of the first main-active device MT1 are separated from each other. The first main-pixel electrode ME1 is electrically connected to the first connection line CL1 through an opening Q1, and the first connection line CL1 is connected to the source region SCH2a of the channel layer SCH2. The opening Q1 is located in the first insulation layer GI, the second insulation layer ILD, the third insulation layer PL, the first protection layer BP1, and the second protection layer BP2, but the disclosure is not limited thereto. In the third embodiment, the first main-pixel electrode ME1 may further include a connecting portion MEC1 (as shown in FIG. 10A), the connecting portion MEC1 and the branching portion MEB1 are connected to each other, and the opening Q1 is disposed corresponding to the connecting portion MEC1.

The first sub-pixel electrode SE1 is electrically connected to the channel layer of other active devices through the opening Q3, and the opening Q3 is located in the first insulation layer GI, the second insulation layer ILD, the third insulation layer PL, and the first protection layer BP1 as an example, but the disclosure is not limited thereto. In the third embodiment, the first sub-pixel electrode SE1 may further include a connecting portion SEC1 (as shown in FIG. 10A), the connecting portion SEC1 and the branching portion SEB1 are connected to each other, and the opening Q3 is disposed corresponding to the connecting portion SEC1. In some embodiments, the first main-pixel electrode ME1 and the first sub-pixel electrode SE1 in the first pixel unit PU1 are disposed between the first scan line SL1, the second scan line SL2, the first data line DL1, and the third data line DL3.

The second connection line CL2 is electrically connected between the third sub-pixel electrode SE3 and the channel layer MCH2 of the second main-active device MT2 disposed on two opposite sides of the fourth data line DL4. In some embodiments, the second main-active device MT2 and the second sub-active device ST2 of the second pixel unit PU2 are respectively adjacent to the fourth data line DL4 and the third data line DL3. In the present embodiment, the second connection line CL2 and the channel layer SCH3 of the third sub-active device ST3 are separated from each other. The third sub-pixel electrode SE3 is electrically connected to the second connection line CL2 through an opening Q2, and the second connection line CL2 is connected to the source region MCH2a of the channel layer MCH2. The opening Q2 is located in the first insulation layer GI, the second insulation layer ILD, the third insulation layer PL, and the first protection layer BP1, but the disclosure is not limited thereto.

The third main-pixel electrode ME3 is electrically connected to the channel layer of other active devices through an opening Q4, and the opening Q4 is located in the first insulation layer GI, the second insulation layer ILD, the third insulation layer PL, the first protection layer BP1, and the second protection layer BP2 as an example, but the disclosure is not limited thereto.

Figure 11:
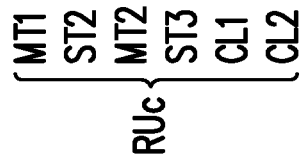
FIG. 11 is a partial schematic circuit diagram of the display device according to the third embodiment of the disclosure.
Figure 11:
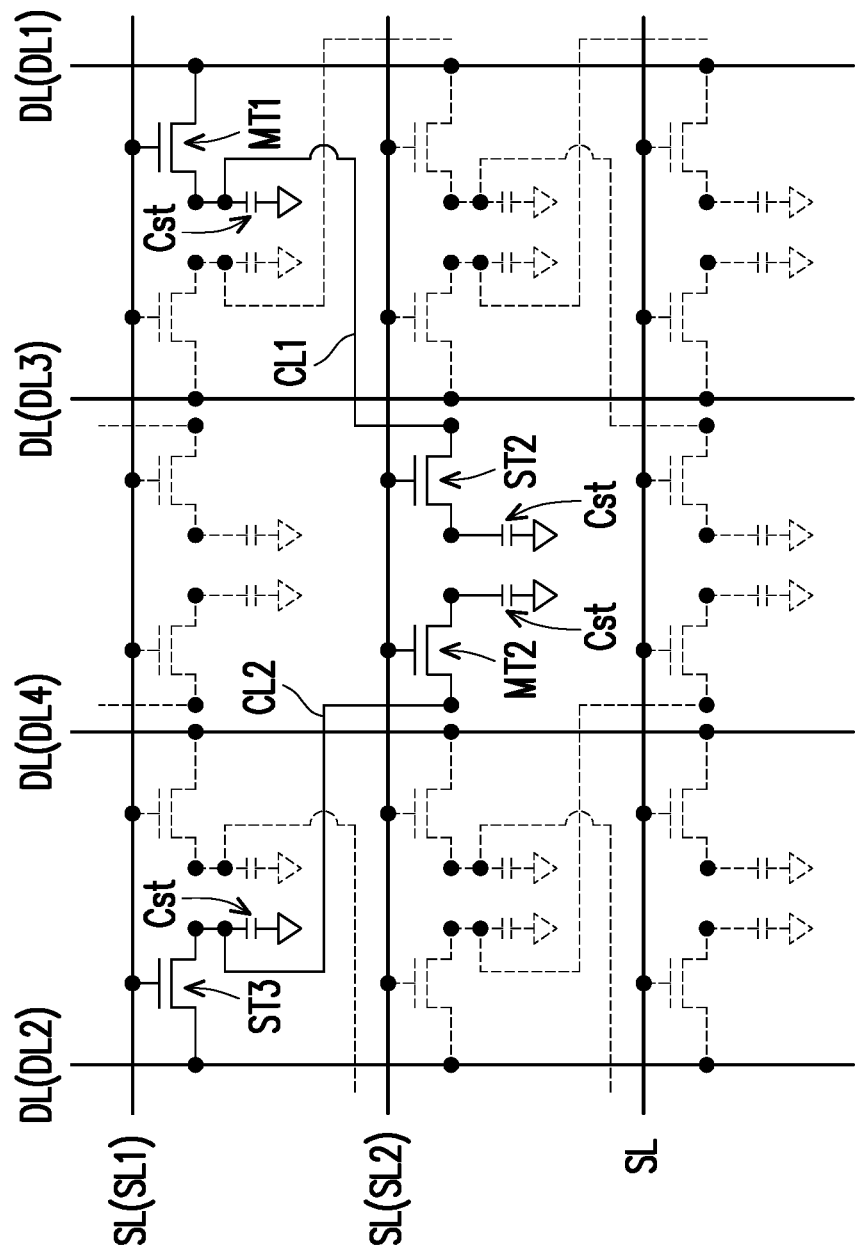

FIG. 11 is a partial schematic circuit diagram of the display device according to the third embodiment of the disclosure.

Referring to FIG. 11, the first main-active device MT1, the second sub-active device ST2, the second main-active device MT2, the third sub-active device ST3, the first connection line CL1, and the second connection line CL2 together form a repeat unit RUc and are electrically connected to the first scan line SL1, the second scan line SL2, the first data line DL1, and the second data line DL2, correspondingly. In FIG. 11, other active devices and connecting lines and storage capacitors connected to those other active devices surrounding the repeat unit RUc are represented by dotted line. In the repeat unit RUc of the third embodiment, the second main-active device MT2 is electrically connected to the third sub-pixel electrode SE3 driven by the second data line DL2 through the second connection line CL2 crossing over the fourth data line DL4. Additionally, the second sub-active device ST2 is electrically connected to the first main-pixel electrode ME1 driven by the first data line DL1 through the first connection line CL1 crossing over the third data line DL3.

In the third embodiment, the operation method of the pixel electrodes in the first pixel unit PU1, the second pixel unit PU2, and the third pixel unit PU3 is similar to the operation method in the second embodiment, and will not be repeated.

Figure 12:
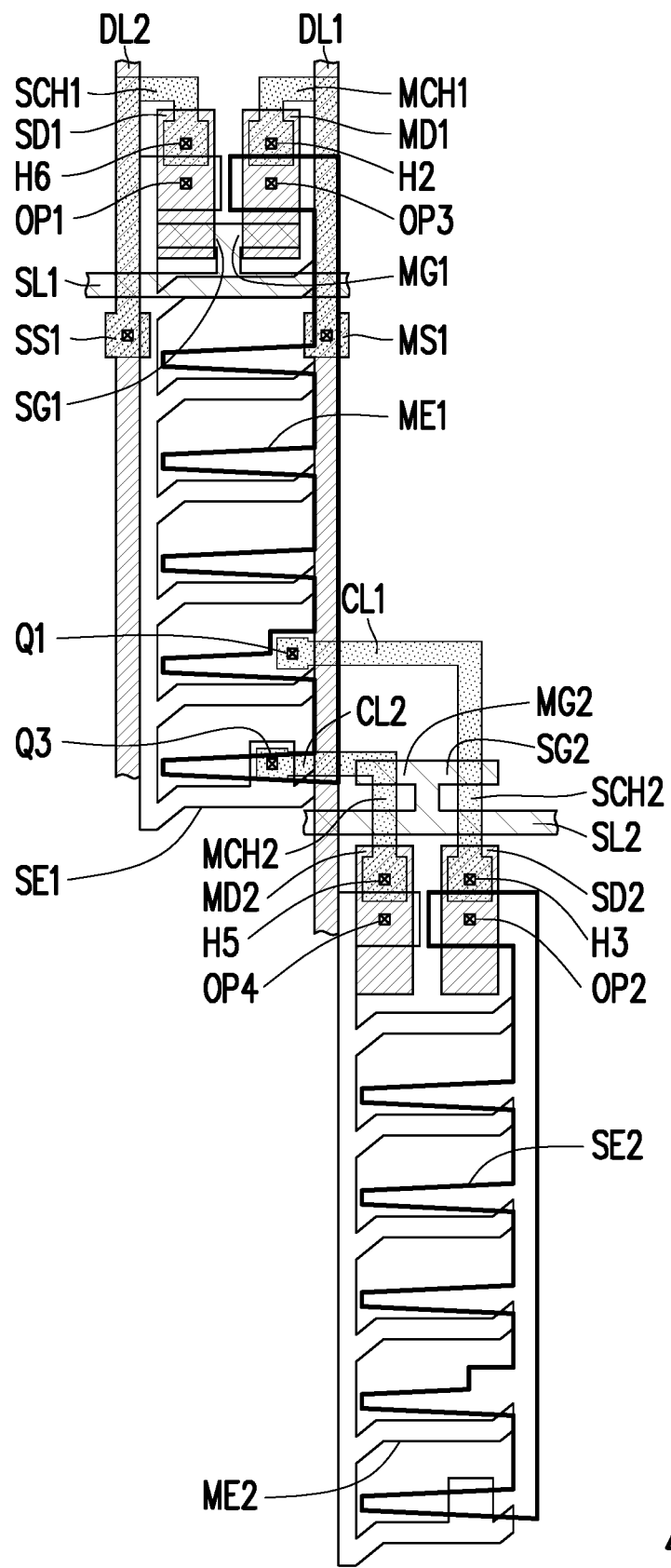
FIG. 12 is a schematic top view of a display device according to the fourth embodiment of the disclosure.
Figure 13:
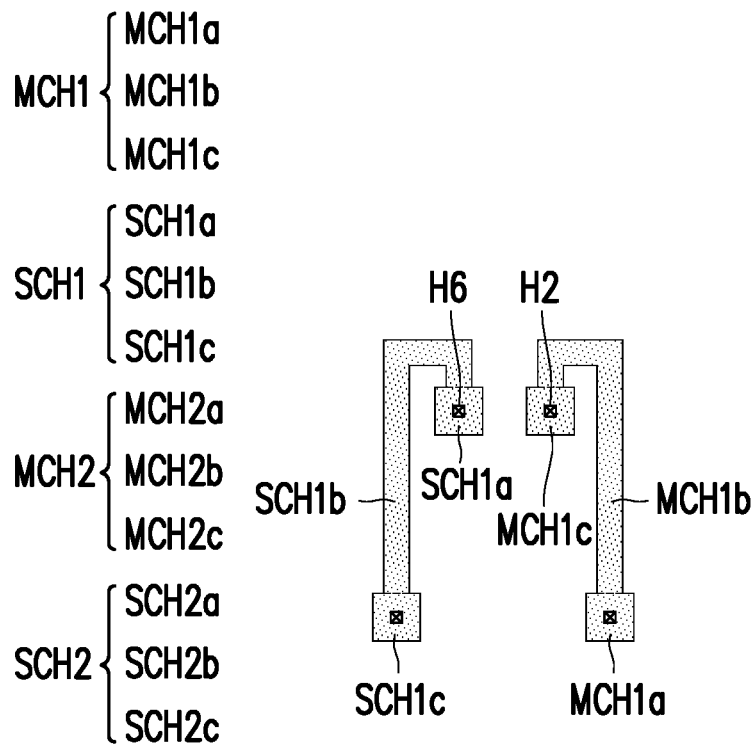
FIG. 13 is a schematic top view of channel layers, openings located on the channel layers, and connection line of the display device in FIG. 12.
Figure 13:
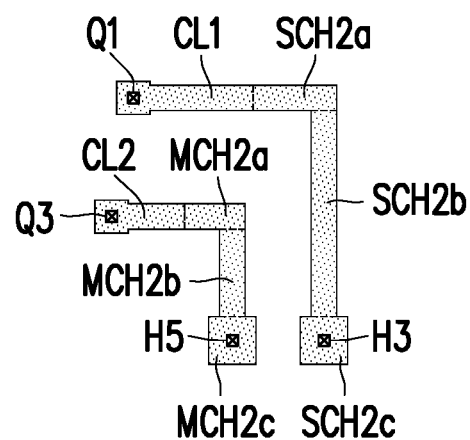

FIG. 12 is a schematic top view of a display device according to the fourth embodiment of the disclosure, and some components of the display device are omitted in FIG. 12. FIG. 13 is a schematic top view of channel layers, openings located on the channel layers, and connection line of the display device in FIG. 12.

It should be noted here, the fourth embodiment in FIG. 12 utilizes component labels and partial content from the first embodiment, wherein identical or similar elements are labeled with identical or similar labels, and therefore description of similar technical content will be omitted. Regarding the description of the omitted parts, reference may be made to the previous embodiment, and will not be repeated.

The main differences between the fourth embodiment and the first embodiment are that, in the display device 40 of the fourth embodiment, the first main-pixel electrode ME1 and the second sub-pixel electrode SE2 have the same shape, and the first sub-pixel electrode SE1 and the second main-pixel electrode ME2 have the same shape.

In the display device 40 of the fourth embodiment, the first main-pixel electrode ME1 and the second sub-pixel electrode SE2 are formed in the same patterning process as an example, and the first sub-pixel electrode SE1 and the second main-pixel electrode ME2 are formed in the same patterning process as an example. In the fourth embodiment, the second sub-pixel electrode SE2 is electrically connected to the drain SD2 of the second sub-active device ST2 through the opening OP2, the opening OP2 is located in the second protection layer BP2, the first protection layer BP1, and the third insulation layer PL as an example. The second main-pixel electrode ME2 is electrically connected to the drain MD2 of the second main-active device MT2 through the opening OP4, and the opening OP4 is located in the first protection layer BP1 and the third insulation layer PL as an example.

In the fourth embodiment, the first main-active device MT1 is electrically connected to the first scan line SL1, the first data line DL1, and the second sub-active device ST2. The first sub-active device ST1 is electrically connected with the first scan line SL1, the second data line DL2, and the second main-active device MT2. The second main-active device MT2 is electrically connected with the second scan line SL2. The second sub-active device ST2 is electrically connected with the second scan line SL2.

Referring to FIG. 12, the first connection line CL1 is electrically connected between the first main-pixel electrode ME1 and the channel layer SCH2 of the second sub-active device ST2 disposed on two opposite sides of the first data line DL1. In the fourth embodiment, the first connection line CL1 and the channel layer MCH1 of the first main-active device MT1 are separated from each other. The first main-pixel electrode ME1 is electrically connected to the first connection line CL1 through an opening Q1, and the first connection line CL1 is connected to the source region SCH2a of the channel layer SCH2. The opening Q1 is located in the first insulation layer GI, the second insulation layer ILD, the third insulation layer PL, the first protection layer BP1, and the second protection layer BP2, but the disclosure is not limited thereto.

In the fourth embodiment, the second connection line CL2 is electrically connected between the first sub-pixel electrode SE1 and the channel layer MCH2 of the second main-active device MT2 disposed on two opposite sides of the first data line DL1. In the fourth embodiment, the second connection line CL2 and the channel layer SCH1 of the first sub-active device ST1 are separated from each other. The first sub-pixel electrode SE1 is electrically connected to the second connection line CL2 through the opening Q3, and the second connection line CL2 is connected to the source region MCH2a of the channel layer MCH2. The opening Q3 is located in the first insulation layer GI, the second insulation layer ILD, the third insulation layer PL, and the first protection layer BP1, but the disclosure is not limited thereto.

Figure 14:
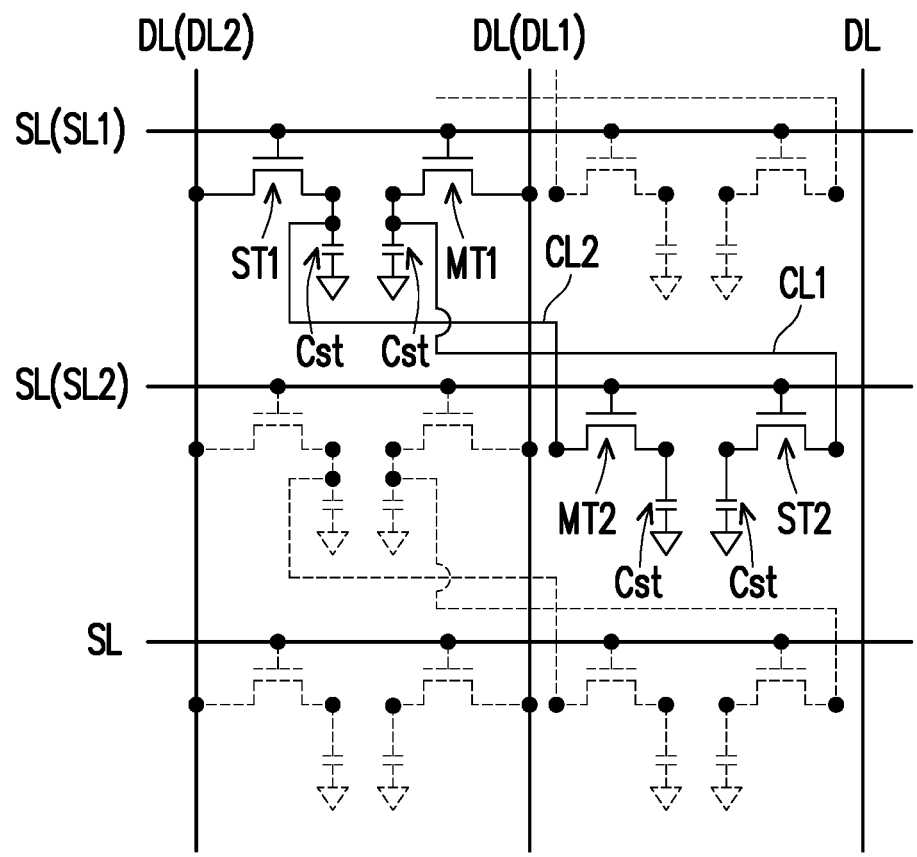
FIG. 14 is a partial schematic circuit diagram of the display device according to the fourth embodiment of the disclosure.
Figure 15A:
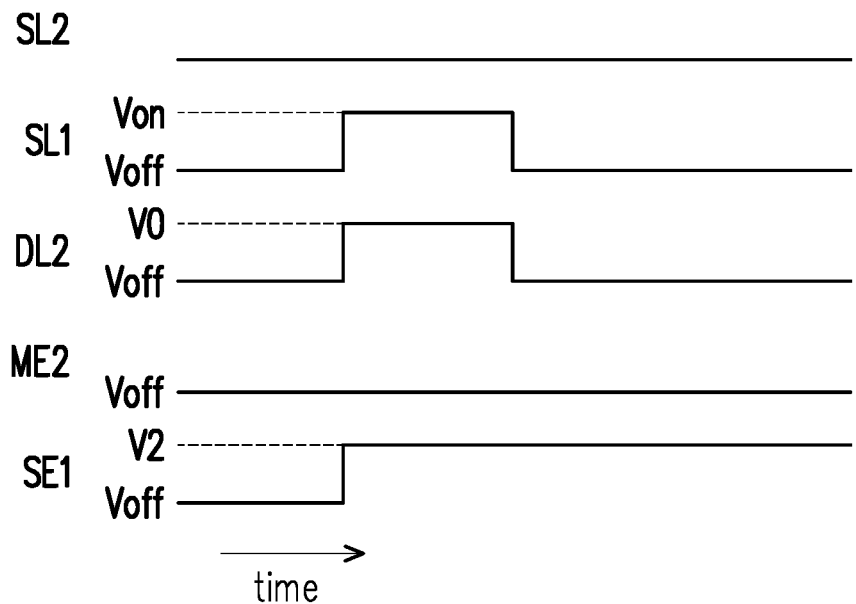
FIG. 15A is a schematic view of an operation method of a pixel unit according to the fourth embodiment of the disclosure.
Figure 15B:
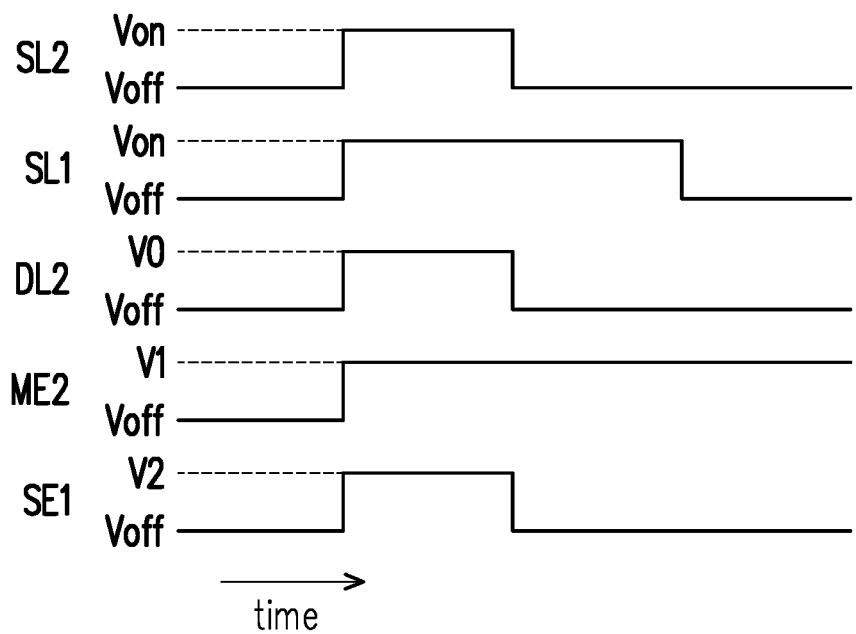
FIG. 15B is a schematic view of an operation method of a pixel unit according to the fourth embodiment of the disclosure.

FIG. 14 is a schematic view of a local circuit of the display device according to the fourth embodiment of the disclosure. FIG. 15A is a schematic view of an operation method of a type of pixel unit according to the fourth embodiment of the disclosure. FIG. 15B is a schematic view of an operation method of a type of pixel unit according to the fourth embodiment of the disclosure.

Referring to FIG. 14, the first main-active device MT1, the first sub-active device ST1, the second main-active device MT2, the second sub-active device ST2, the first connection line CL1, and the second connection line CL2 together form a repeat unit RUd and are electrically connected to the first scan line SL1, the second scan line SL2, the first data line DL1, and the second data line DL2, correspondingly. In FIG. 14, other active devices and connecting lines and storage capacitors connected to those other active devices surrounding the repeat unit RUd are represented by dotted line.

In the fourth embodiment, the first main-pixel electrode ME1 is operated in a manner similar to the first main-pixel electrode ME1 in FIG. 5B, and will not be repeated.

Referring to FIG. 14 and FIG. 15A, in the fourth embodiment, the method of operating the first sub-pixel electrode SE1 is described hereinafter. Firstly, a voltage is applied to the first scan line SL1 and the second data line DL2 to active the first sub-active device ST1 (for example, a voltage Von is applied to the first scan line SL1 and a voltage V0 is applied to the second data line DL2), and the second voltage V2 is applied to the first sub-pixel electrode SE1. At the same time, there is no voltage applied to the second scan line SL2, or a smaller voltage is applied to the second scan line SL2. After the first sub-active device ST1 is activated for a while, the voltages applied to the first scan line SL1 and the second data line DL2 are stopped to deactivate the first sub-active device ST1. Since the first sub-pixel electrode SE1 is electrically connected to the capacitor Cst (because of capacitance generated by the voltage difference between the first sub-pixel electrode SE1 and the common electrode CE, as an example), even though the first sub-active device ST1 is deactivated, the voltage on the first sub-pixel electrode SE1 remains for a period of time.

Referring to FIG. 14 and FIG. 15B simultaneously, in the fourth embodiment, the method of operating the second main-pixel electrode ME2 is described hereinafter. Firstly, a voltage is applied to the first scan line SL1 and the second data line DL2 to active the first sub-active device ST1, for example, a voltage Von is applied to the first scan line SL1 and a voltage V0 is applied to the second data line DL2. At the same time, the voltage Von is applied to the second scan line SL2 to activate the second main-active device MT2. Since the second connection line CL2 is electrically connected with the first sub-pixel electrode SE1 and the channel layer MCH2 of the second main-active device MT2, voltages are applied to the first sub-pixel electrode SE1 and the second main-pixel electrode ME2 at the same time. For example, a voltage V1 is applied to the second main-pixel electrode ME2, and a voltage V2 is applied to the first sub-pixel electrode SE1. After the first sub-active device ST1 is activated for a while, the voltages applied to the second scan line SL2 and the second data line DL2 are stopped to deactivate the second main-active device MT2. Since the second main-pixel electrode ME2 is electrically connected to the capacitor Cst (because of capacitance generated by the voltage difference between the second main-pixel electrode ME2 and the common electrode CE, as an example), even though the second main-active device MT2 is deactivated, the voltage on the second main-pixel electrode ME2 remains for a period of time. In some embodiments, the voltage applied to the second scan line SL2 is stopped first, so as to deactivate the second main-active device MT2. At this time, the voltage of the second main-pixel electrode ME2 remains. In another embodiment, an opposite voltage is applied to the second data line DL2 to eliminate the voltage remaining on the first sub-pixel electrode SE1. Finally, the voltage applied to the second data line DL2 and the first scan line SL1 is stopped. Since the second main-active device MT2 is in deactivated state, the opposite voltage is not applied to the second main-pixel electrode ME2, so that the voltage remaining on the second main-pixel electrode ME2 is not eliminated.

In the fourth embodiment, the second sub-pixel electrode SE2 is operated in a manner similar to the second sub-pixel electrode SE2 in FIG. 5A, and will not be repeated.

In summary, the number of data lines is reduced via disposing the first connection line and the second connection line. Moreover, the resolution of the display device can be significantly improved by reducing the number of openings connecting the channel layers to the data lines.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device, comprising:
   a first scan line, a second scan line, and a first data line;
   a first pixel unit, comprising:
   a first main-active device, electrically connected with the first scan line and the first data line;
   a first sub-active device, electrically connected with the first scan line;
   a first main-pixel electrode, electrically connected with the first main-active device; and
   a first sub-pixel electrode, electrically connected with the first sub-active device, wherein a shape of the first main-pixel electrode is different from a shape of the first sub-pixel electrode; and
   a second pixel unit, comprising:
   a second main-active device, electrically connected with the second scan line;
   a second sub-active device, electrically connected with the second scan line;
   a second main-pixel electrode, electrically connected with the second main-active device; and
   a second sub-pixel electrode, electrically connected with the second sub-active device, wherein a shape of the second main-pixel electrode is different from a shape of the second sub-pixel electrode;
   a first connection line, electrically connected with the first main-active device and the second sub-active device; and
   a second data line electrically connected with the second main-active device.

2. The display device as recited in claim 1, wherein the first main-pixel electrode and the second main-pixel electrode have a same shape, and the first sub-pixel electrode and the second sub-pixel electrode have a same shape.

3. The display device as recited in claim 1, wherein
   the first main-active device comprises:
   a first gate, electrically connected with the first scan line;
   a first channel layer, overlapping with the first gate; and
   a first source and a first drain, electrically connected with the first channel layer; and
   the second sub-active device comprises:
   a second gate, electrically connected with the second scan line;
   a second channel layer, overlapping with the second gate, and a source region of the second channel layer being connected to the first connection line; and
   a second drain, electrically connected with the second channel layer, wherein the first channel layer, the second channel layer, and the first connection line belong to a same patterned conductive layer.

4. The display device as recited in claim 1, further comprises:
   a common electrode, overlapping with the first main-pixel electrode, the first sub-pixel electrode, the second main-pixel electrode, and the second sub-pixel electrode.

5. The display device as recited in claim 1, wherein a gate of the first main-active device and a gate of the first sub-active device together form an I shape, and a gate of the second main-active device and a gate of the second sub-active device together form an I shape.

6. A display device, comprising:
   a first scan line, a second scan line, and a first data line;
   a first pixel unit, comprising:
      a first main-active device, electrically connected with the first scan line and the first data line;
      a first sub-active device, electrically connected with the first scan line;
      a first main-pixel electrode, electrically connected with the first main-active device; and
      a first sub-pixel electrode, electrically connected with the first sub-active device, wherein a shape of the first main-pixel electrode is different from a shape of the first sub-pixel electrode; and
   a second pixel unit, comprising:
      a second main-active device, electrically connected with the second scan line;
      a second sub-active device, electrically connected with the second scan line;
      a second main-pixel electrode, electrically connected with the second main-active device; and
      a second sub-pixel electrode, electrically connected with the second sub-active device, wherein a shape of the second main-pixel electrode is different from a shape of the second sub-pixel electrode;
   a first connection line, electrically connected with the first main-active device and the second sub-active device; and
   a second data line, a third data line, and a fourth data line, wherein the third data line is electrically connected with the first sub-active device;
   a third pixel unit, comprising:
      a third main-active device, electrically connected with the first scan line and the fourth data line;
      a third sub-active device, electrically connected with the first scan line and the second data line;
      a third main-pixel electrode, electrically connected with the third main-active device; and
      a third sub-pixel electrode, electrically connected with the third sub-active device, wherein a shape of the third main-pixel electrode is different from a shape of the third sub-pixel electrode; and
   a second connection line, electrically connected with the third sub-active device and the second main-active device.

7. The display device as recited in claim 6, wherein the first main-pixel electrode, the second main-pixel electrode, and the third main-pixel electrode have a same shape, and the first sub-pixel electrode, the second sub-pixel electrode, and the third sub-pixel electrode have a same shape.

8. The display device as recited in claim 6, wherein the first main-pixel electrode, the second sub-pixel electrode, and the third main-pixel electrode have a same shape, and the first sub-pixel electrode, the second main-pixel electrode, and the third sub-pixel electrode have a same shape.

9. The display device as recited in claim 6, wherein the first main-active device comprises:
   a first gate, electrically connected with the first scan line;
   a first channel layer, overlapping with the first gate; and
   a first source and a first drain, electrically connected with the first channel layer; and
the second sub-active device comprises:
   a second gate, electrically connected with the second scan line;
   a second channel layer, overlapping with the second gate, and a source region of the second channel layer being connected to the first connection line; and
   a second drain, electrically connected with the second channel layer, wherein the first channel layer, the second channel layer, the first connection line, and the second connection line belong to a same patterned conductive layer.

10. A display device, comprising:
   a first scan line, a second scan line, and a first data line;
   a first pixel unit, comprising:
      a first main-active device, electrically connected with the first scan line and the first data line;
      a first sub-active device, electrically connected with the first scan line;
      a first main-pixel electrode, electrically connected with the first main-active device; and
      a first sub-pixel electrode, electrically connected with the first sub-active device, wherein a shape of the first main-pixel electrode is different from a shape of the first sub-pixel electrode; and
   a second pixel unit, comprising:
      a second main-active device, electrically connected with the second scan line;
      a second sub-active device, electrically connected with the second scan line;
      a second main-pixel electrode, electrically connected with the second main-active device; and
      a second sub-pixel electrode, electrically connected with the second sub-active device, wherein a shape of the second main-pixel electrode is different from a shape of the second sub-pixel electrode;
   a first connection line, electrically connected with the first main-active device and the second sub-active device; and
   a second data line, electrically connected with the first sub-active device; and
   a second connection line, electrically connected with the first sub-active device and the second main-active device.

11. The display device as recited in claim 10, wherein the first main-pixel electrode and the second sub-pixel electrode have a same shape, and the first sub-pixel electrode and the second main-pixel electrode have a same shape.

12. The display device as recited in claim 10, wherein the first main-active device comprises:
   a first gate, electrically connected with the first scan line;
   a first channel layer, overlapping with the first gate; and
   a first source and a first drain, electrically connected with the first channel layer; and
the second sub-active device comprises:
   a second gate, electrically connected with the second scan line;
   a second channel layer, overlapping with the second gate, and a source region of the second channel layer being connected to the first connection line; and
   a second drain, electrically connected with the second channel layer, wherein the first channel layer, the second channel layer, the first connection line, and the second connection line belong to a same patterned conductive layer.

13. A display device, comprising:
a first scan line, a second scan line, and a first data line;
a first pixel unit, comprising:
a first main-active device, electrically connected with the first scan line and the first data line;
a first sub-active device, electrically connected with the first scan line;
a first main-pixel electrode, electrically connected with the first main-active device; and
a first sub-pixel electrode, electrically connected with the first sub-active device, wherein a shape of the first main-pixel electrode is different from a shape of the first sub-pixel electrode; and
a second pixel unit, comprising:
a second main-active device, electrically connected with the second scan line;
a second sub-active device, electrically connected with the second scan line;
a second main-pixel electrode, electrically connected with the second main-active device; and
a second sub-pixel electrode, electrically connected with the second sub-active device, wherein a shape of the second main-pixel electrode is different from a shape of the second sub-pixel electrode; and
a first connection line, electrically connected with the first main-active device and the second sub-active device, wherein
the first main-pixel electrode comprises:
a first main portion; and
a plurality of first branching portions, connected with the first main portion, widths of the plurality of first branching portions decrease in a direction away from the main portion; and
the first sub-pixel electrode comprises:
a second main portion; and
a plurality of second branching portions, connected with the second main portion, each of the second branching portions comprising a first connecting portion, a second connecting portion, and a third connecting portion sequentially connected, wherein the first connecting portion is connected to the second main portion, and an extending direction of the second connecting portion is different from an extending direction of the first connecting portion and an extending direction of the third connecting portion.

14. The display device as recited in claim 13, wherein the plurality of first branching portions and the plurality of second branching portions are alternately arranged.

* * * * *